United States Patent [19]

Curran

[11] 4,433,914
[45] Feb. 28, 1984

[54] EXPOSURE METER

[75] Inventor: Kenneth J. Curran, Thousand Oaks, Calif.

[73] Assignee: Vivitar Corporation, Santa Monica, Calif.

[21] Appl. No.: 75,709

[22] Filed: Sep. 14, 1979

[51] Int. Cl.³ .............................................. G01J 1/46
[52] U.S. Cl. ..................................... 356/223; 356/226
[58] Field of Search ................... 354/60 L, 60 E, 53, 354/127, 128, 24, 41; 356/226, 223

[56] References Cited

U.S. PATENT DOCUMENTS

| | | | |
|---|---|---|---|
| 3,709,615 | 1/1973 | Blakeslee et al. | 356/224 |
| 3,798,662 | 3/1974 | Suzuki | 354/24 |
| 3,884,584 | 5/1975 | Tsunekawa et al. | 356/226 |
| 3,909,137 | 9/1975 | Kisanuki | 354/24 |

Primary Examiner—Bruce Y. Arnold
Attorney, Agent, or Firm—Lyon & Lyon

[57] ABSTRACT

Disclosed herein are system and apparatus for providing an indication of proper photographic exposure for lighting conditions which include both flash and continuous light sources. An optical sensor provides a signal representative of instantaneous existing lighting conditions either to a logarithmic amplifier for continuous lighting condition measurement or to an integrator controlled by a timer for flash ambient lighting condition measurement. A sample and hold circuit receives the integrator output and provides the same to the logarithmic amplifier which is calibrated with respect to the optical sensor. The logarithmic amplifier supplies either continuous or flash exposure indicia to a display, which may comprise either a digital display or a motorized dial. An accessory program input is provided between the logarithmic amplifier and the display to receive compensating signals from optical accessories that may be mated to the optical sensor. Also disclosed herein is optical accessory interface means including an extending member that has an orifice at one end thereof and that is adapted to be disposed within a receiving member that has an optical sensor at one end so as to align the orifice adjacent to the optical sensor.

18 Claims, 16 Drawing Figures

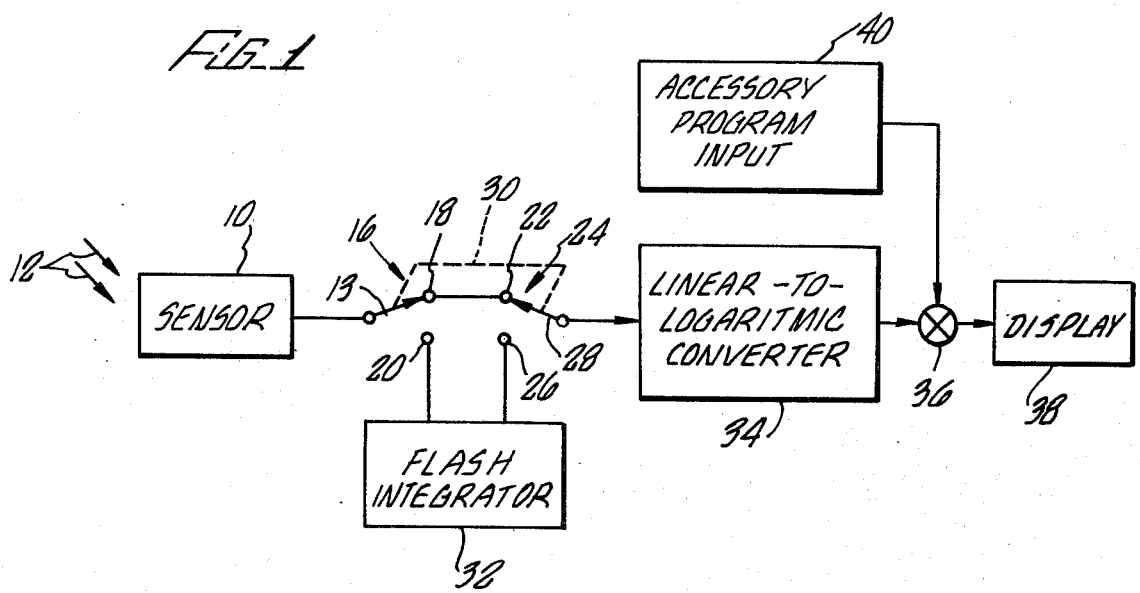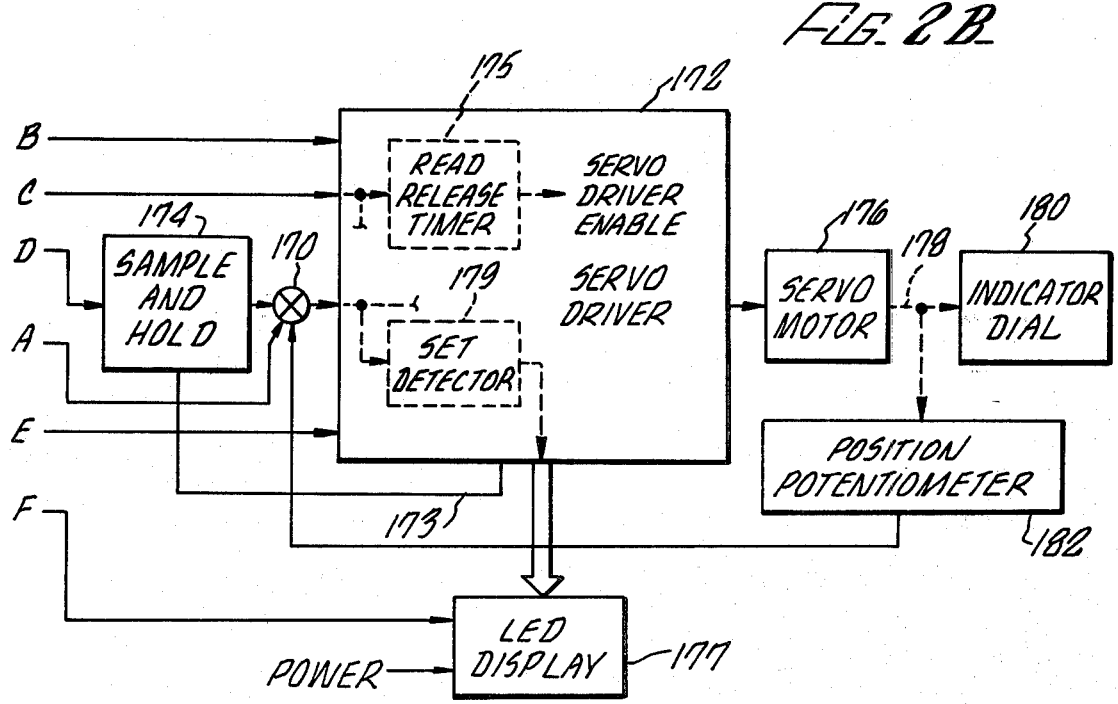

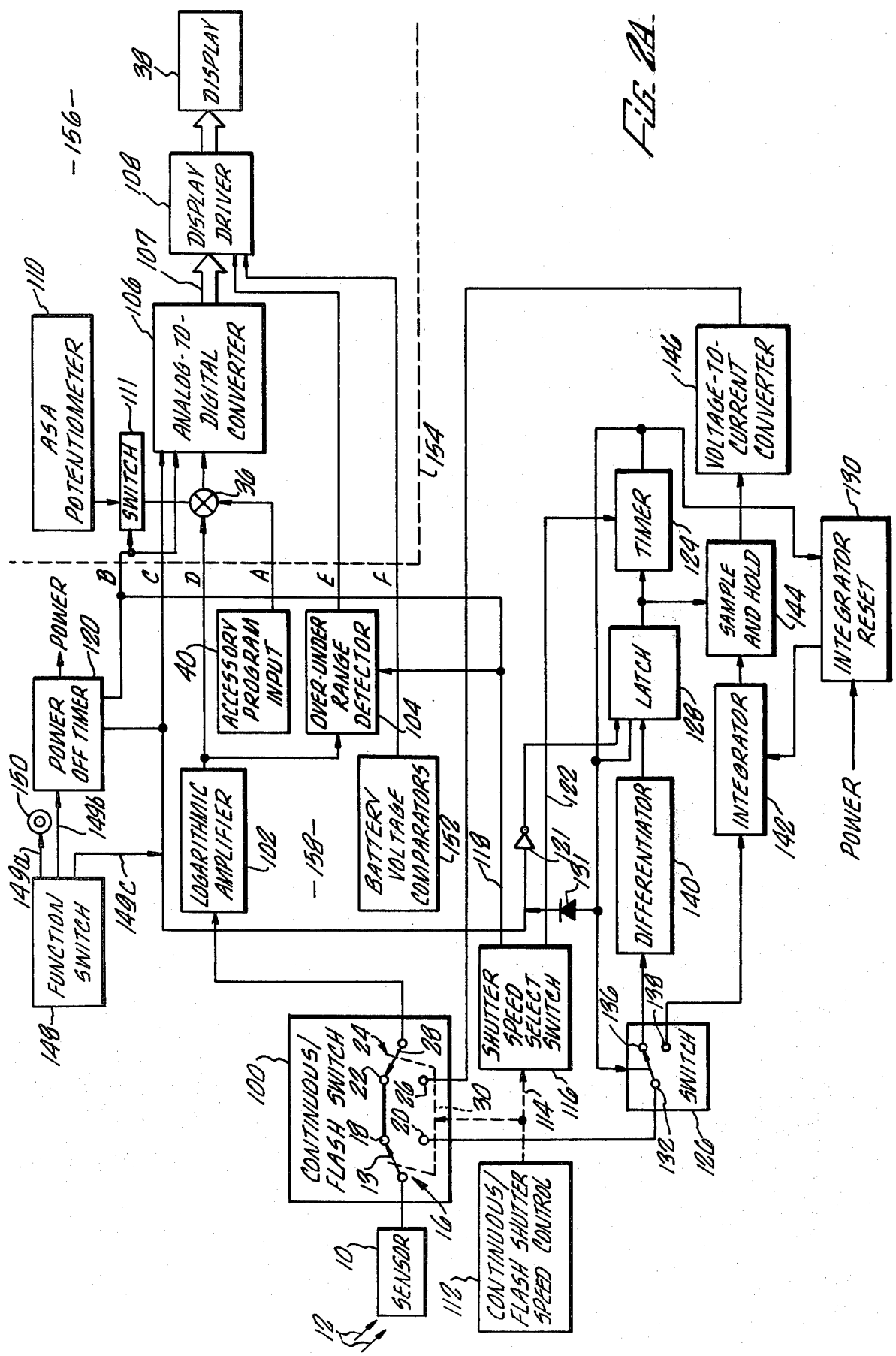

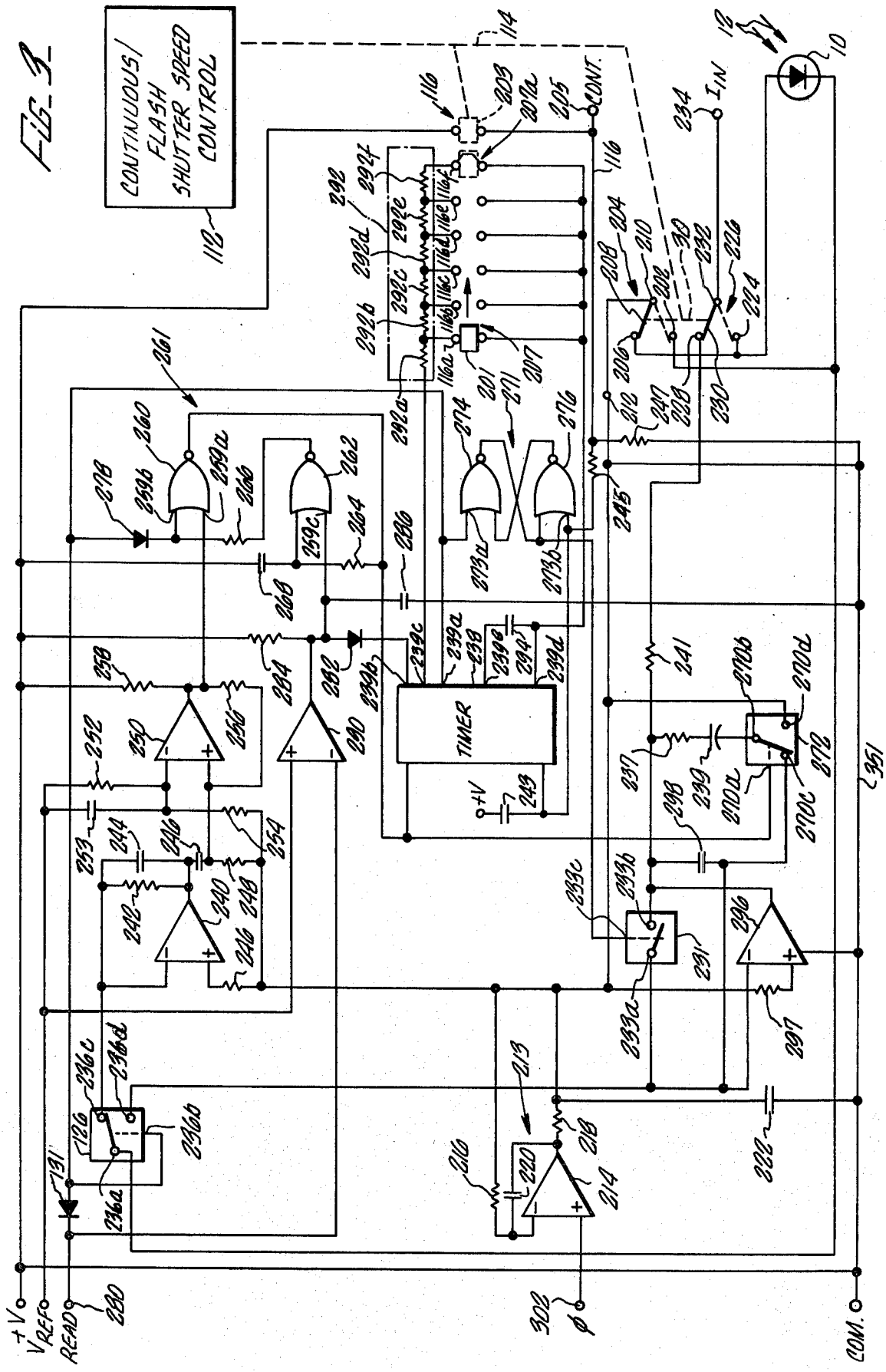

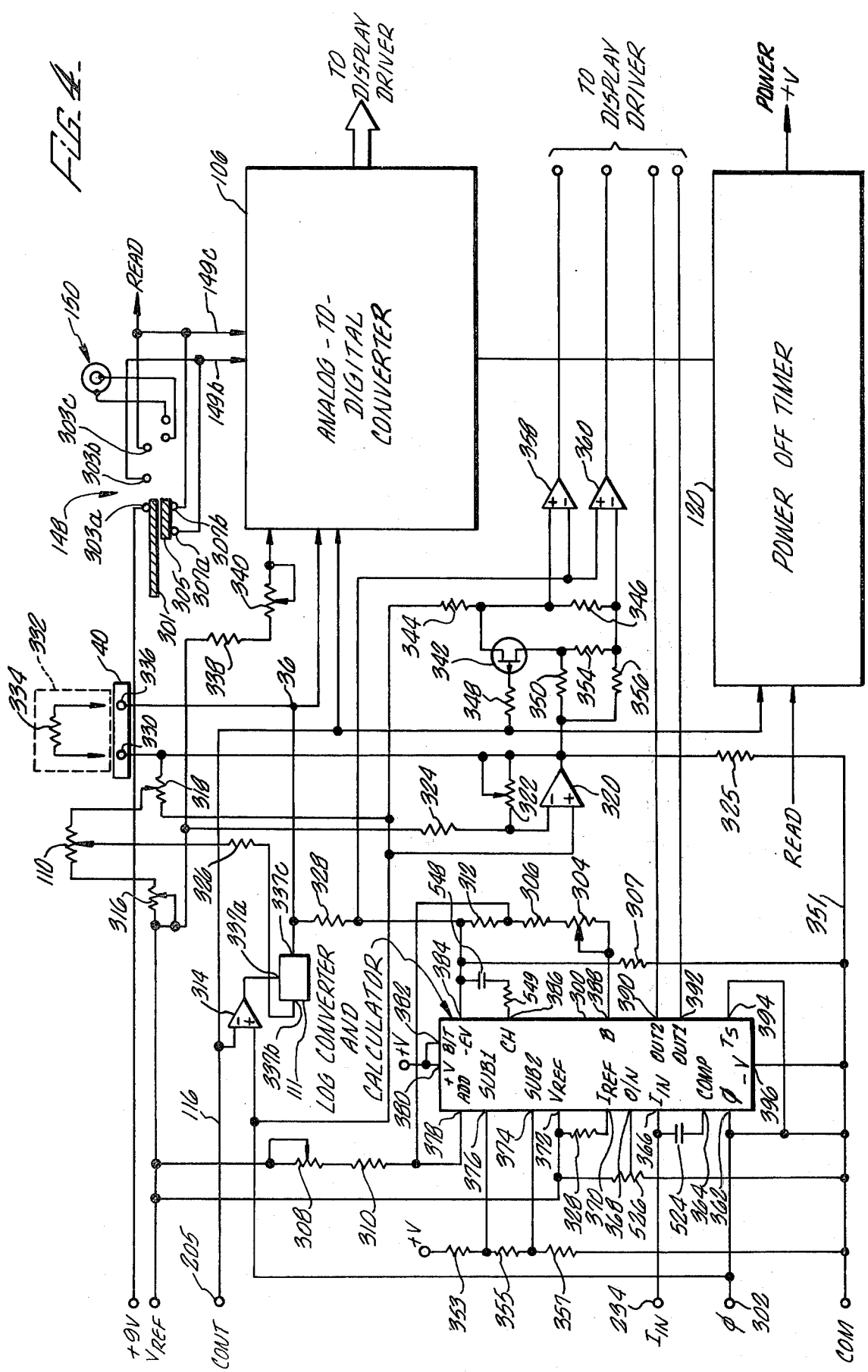

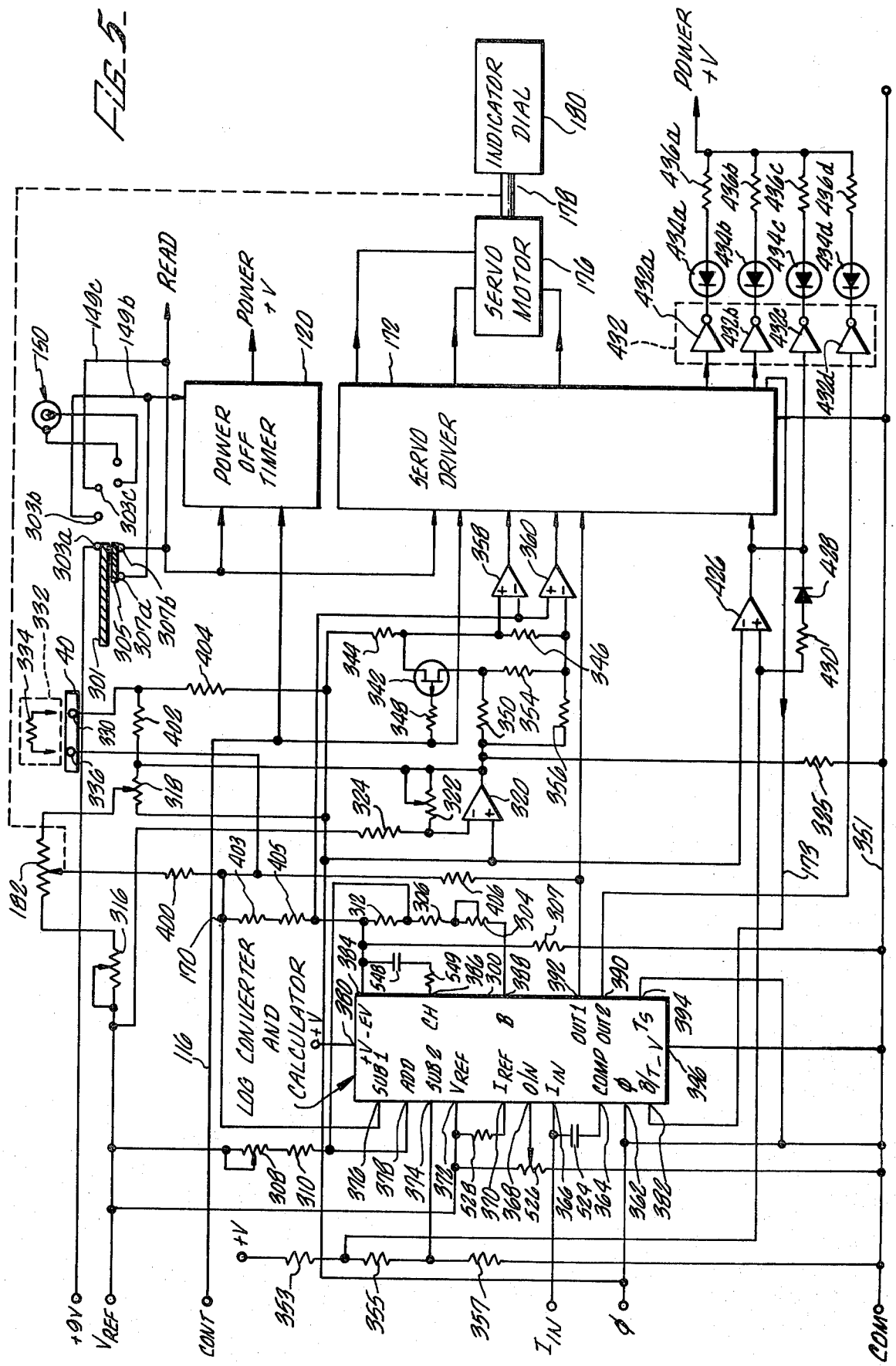

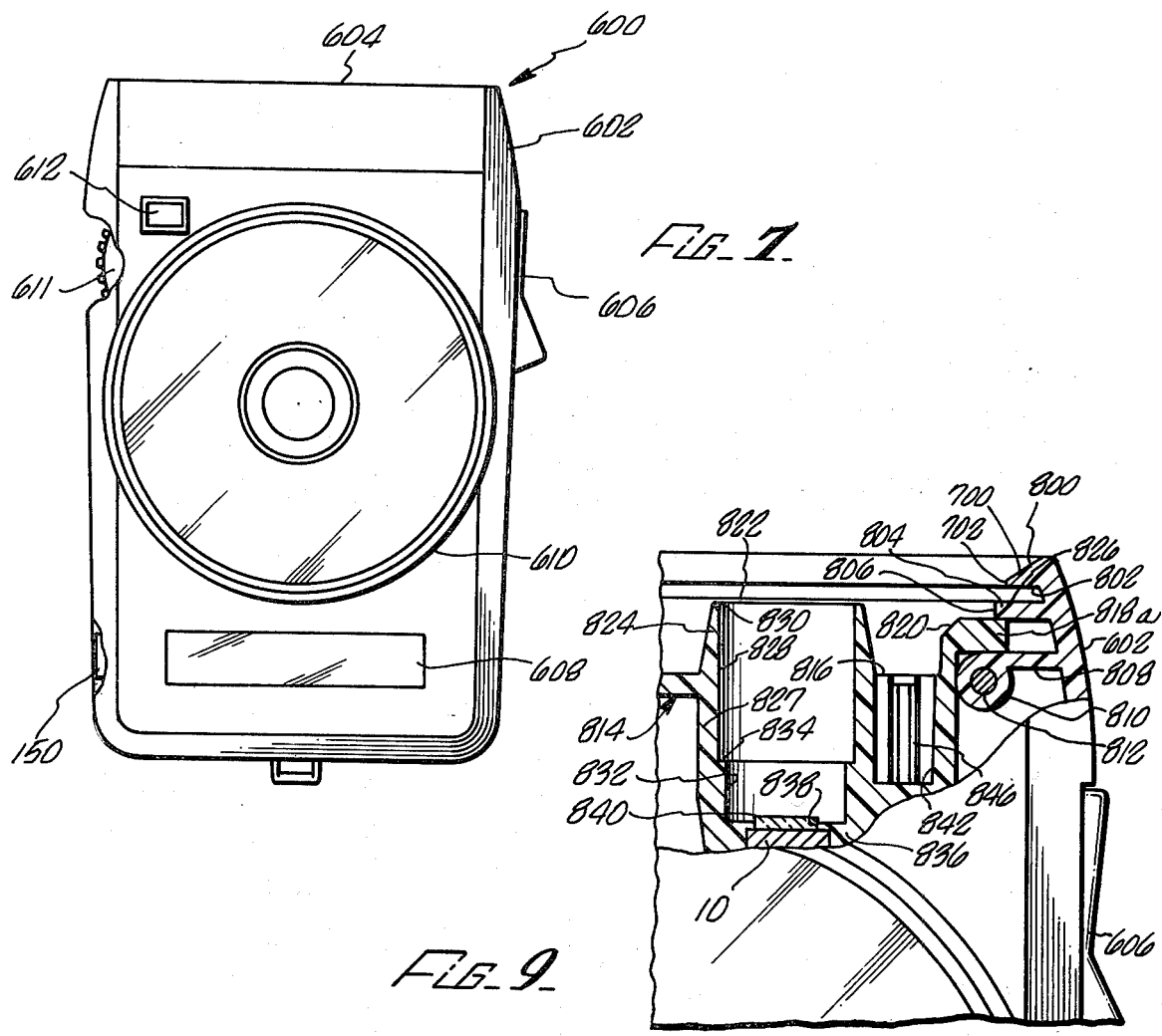
FIG. 7.
FIG. 9.
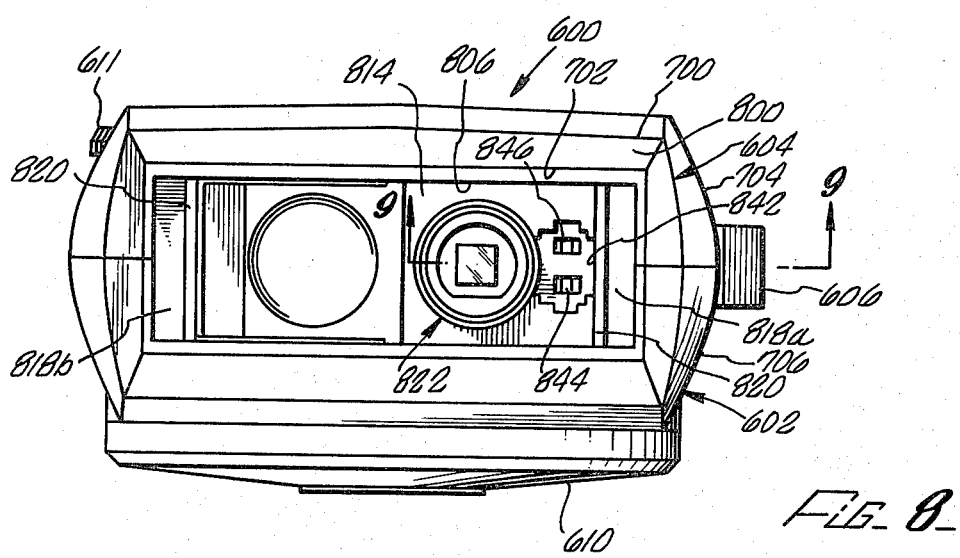
FIG. 8.

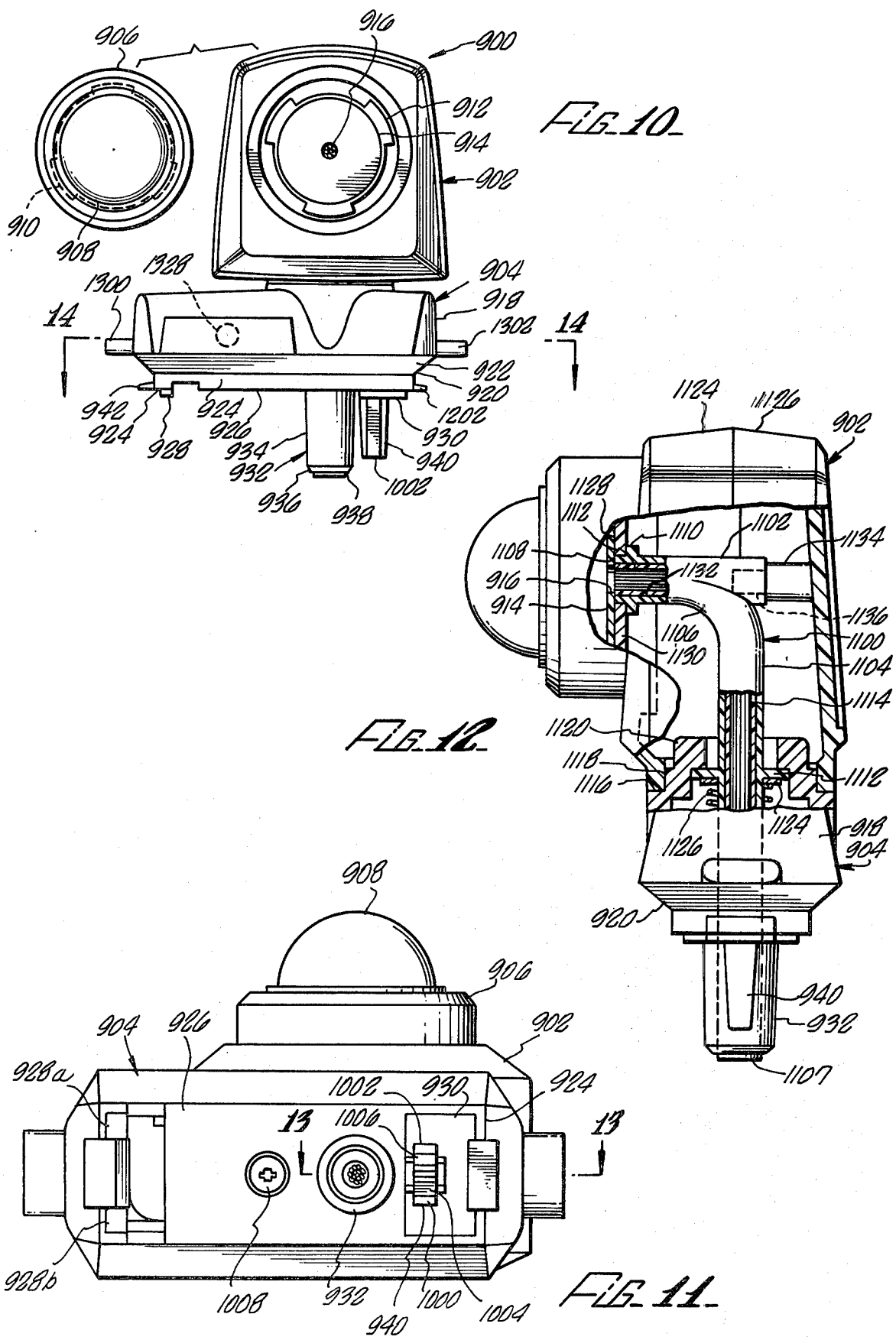

EXPOSURE METER

The present invention relates generally to exposure metering systems, and more particularly to exposure metering systems capable of monitoring both flash and continuous light sources.

In order to correctly expose photographic film, it is necessary to first measure either the light falling upon the subject (incident light) or the light reflected by the subject. Once this measurement is made, a range of camera shutter speeds and corresponding aperture settings are then calculated according to the film sensitivity or speed expressed by means of ASA or DIN numbers. Where continuous light sources are used to illuminate the subject, an exposure meter may be used to measure the light intensity at any arbitrary moment and that measurement may then be used to determine shutter speed and aperture setting.

However, when a flashed light source is used to illuminate the subject, it is necessary to measure the total amount of light that is available during the period of time that the camera shutter is open. This total amount of light may include light both from continuous sources and from one or more flashed light source. Once this measurement is made, the lens aperture setting may be calculated according to the film sensitivity. Integrating exposure meters that provide such a measurement generally include an integrator which sums the instantaneous light intensity over a predetermined period of time. Exposure meters that are responsive to continuous light sources may be adapted to be responsive to flashed light sources by attaching an accessory which provides the necessary integrating function. The use of the accessory, however, may require that the accessory be calibrated to the exposure meter or that the operator make additional computations based on the exposure meter reading before accurate results are obtained.

The exposure meter of the present invention overcomes the limitations of prior exposure meters by providing exposure information either for continuous light sources or for flashed light sources without having to calibrate or compensate the exposure meter reading when changing from continuous light measure to flashed light measurement or vice versa. The exposure meter is responsive to correction signals provided by accessories that may be attached to the exposure meter, thereby eliminating the necessity of recalibration or compensation to correct for the influence the accessory may have on the exposure meter sensitivity.

Accordingly, the exposure meter disclosed herein includes an optical sensor that provides a signal proportional to the instaneous intensity of light falling thereon. In the continuous light measurement mode, the signal is applied through a switching means to a logarithmic amplifier. The logarithmic amplifier generates a signal that is proportional to the logarithm of the signal from the sensor and is thus proportional to the general response characteristics of photographic film. The logarithmic amplifier signal is provided to a display which may be of a digital nature to provide the operator with a number that is then used to compute shutter speed and aperture setting according to film sensitivity. In an alternate embodiment, the display is a servo-driven dial that directly indicates the appropriate exposure data. When the exposure meter is in the flashed light mode of operation, the signal from the sensor is provided to a flash integrator circuit which integrates the signal over a period of time equal to one of several selectable shutter speeds. The flash integrator samples and holds this integrated value at the end of the integration period and provides a signal proportional thereto through the switching means to the logarithmic amplifier. The logarithmic amplifier and the display then cooperate to display an aperture setting according to a pre-set film sensitivity value.

The exposure meter further includes an accessory input that accepts an accessory program signal from optical accessories that may be attached to the exposure meter. This program signal is summed with the output of the logrithmic amplifier and the sum is applied to the display as previously described. In this manner, the exposure meter output is compensated for any effect that the accessory may have on the exposure meter sensitivity without additional calibration.

Optical accessories are also known that may be removably attached to an exposure meter. These optical accessories apply various optical modifying means to the exposure meter sensor. It is required, however, that the interface between the sensor and the optical accessory accurately position the optical accessory transmission path with respect to the sensor and that the transmission path attenuation be minimized. The optical accessory interface means of the present invention satisfies these requirements and additionally defines the reflected light measuring angle of the exposure meter and prevents stray light from falling on the sensor when an optical accessory is in place. The optical accessory interface means includes a member extending from the optical accessory. This extending member has a orifice formed through which the light gathered by the optical accessory is transmitted at one end. The optical accessory interface means further includes a receiving member disposed within an exposure meter with the exposure meter sensor positioned at an end of the receiving member. When the optical accessory is used with the exposure meter, the extending member is disposed within the receiving member so as to accurately position the oriface adjacent to the sensor.

The term "continuous light" or "continuous light source" as used herein indicates light from sources that is continuous for the purposes of photographic measurements and may include, for example, sunlight, fluorescent lights or neon lights, the latter two of which may display certain periodic light intensity variation according to the instantaneous magnitude of the applied voltage. The term "flashed light" or "flashed light source" as used herein includes flashed light sources generally used for photographic purposes, such as electronic strobe or photo flash lights or flash bulbs. Further, it is to be understood that the exposure meter of the present invention when determining exposure data for flashed light sources will provide a measurement of the total light available during the selected shutter speed time interval and that this total light may include not only light from a flashed light source but also ambient light from continuous light sources.

It is thus an object of the present invention to provide an improved exposure meter.

It is another object of the present invention to provide an exposure meter for either continuous light sources or flashed light sources and continuous light sources.

It is a further object of the present invention to provide an exposure meter that is responsive to compensation signals from accessories that may be attached thereto.

It is yet another object of the present invention to provide an interface means between an optical accessory and an exposure meter.

These and other objects and advantages of the present invention will be better understood through a consideration of the following description taken in conjunction with the drawings in which:

FIG. 1 is an system block diagram of an exemplary embodiment of the present invention.

FIG. 2A is a more detailed block diagram of the exposure meter of the FIG. 1. FIG. 2B shows alternative display means.

FIG. 3 is a schematic diagram of the flash integrator circuit of FIGS. 2A and 2B.

FIG. 4 is a schematic diagram of a linear-to-logarithmic converter for a preferred embodiment of the present invention.

FIG. 5 is a schematic diagram of the linear-to-logarithmic converter of an alternative embodiment of the present invention.

FIG. 7 is a plan view of an exposure meter according to a preferred embodiment of the present invention.

FIG. 8 is an end view of the exposure meter of FIG. 7.

FIG. 9 is a view taken substantially along the section line 9—9 of FIG. 8.

FIG. 10 is a plan view of an exemplary optical accessory employing the optical accessory interface means of the invention disclosed herein.

FIG. 11 is a bottom view of the accessory of FIG. 10.

FIG. 12 is a side view including cut-a-way sections of the accessory of FIG. 10 according to the present invention.

Figure 6:
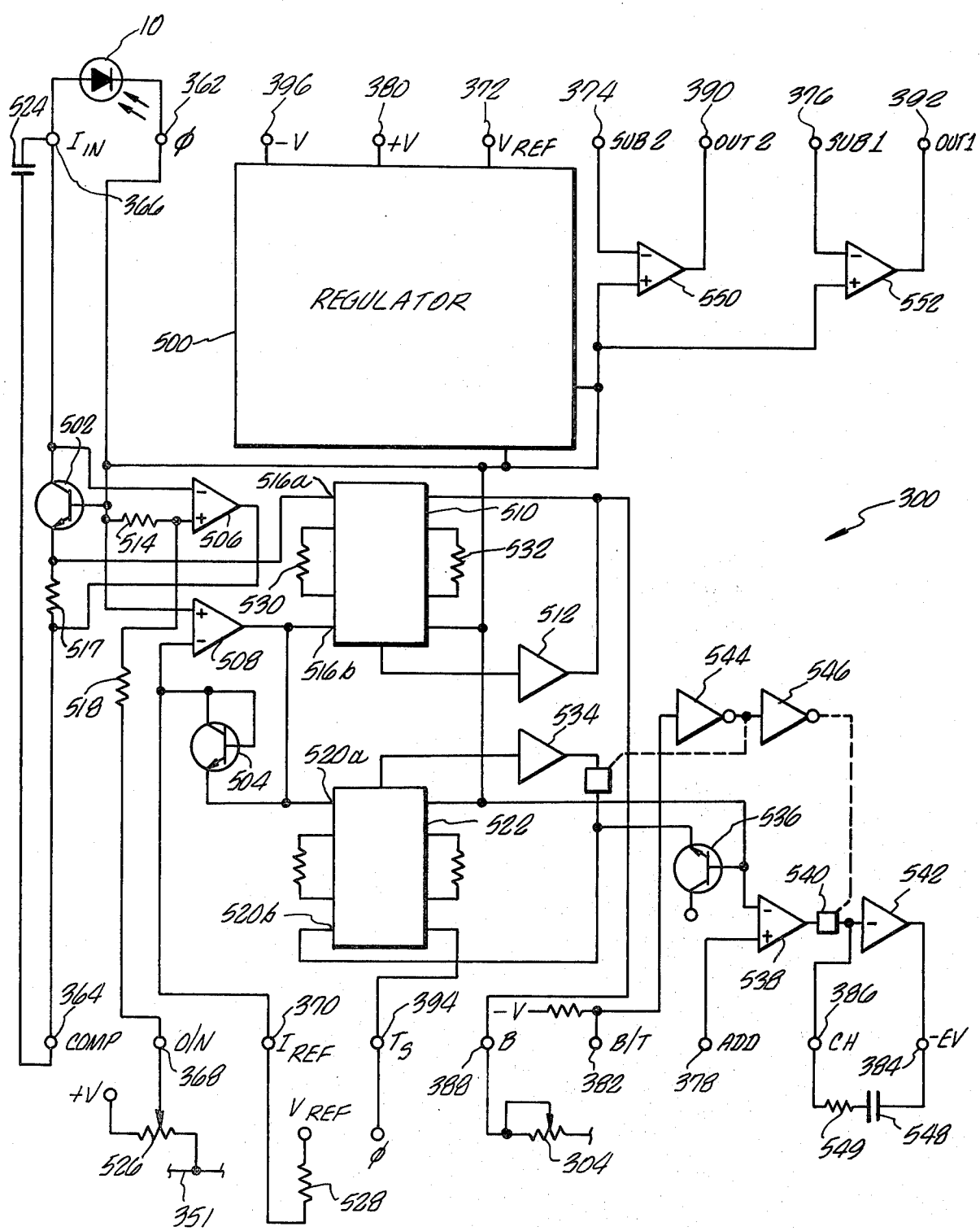
FIG. 6 is a diagram of the logarithmic converter and calculator chip shown in FIGS. 4 and 5.

Referring now in particular to FIG. 1, shown therein in block diagram form is an exemplary embodiment of the system of the present invention. An optical sensor 10 which is responsive to incident light indicated by the arrows 12, generates a signal that is proportional to the intensity of the light 12. This signal is applied to a center arm 13 of a first double pole-double throw (DPDT) switch 16 that has a first contact 18 and a second contact 20. The second contact 20 is connected to a first contact 22 of a second DPDT switch 24. The second double pull-double throw switch 24 includes a second contact 26 and a center arm 28. The center arms 13 and 28 are mechanically joined by means of a link 30. Connected to the first contact 20 of the switch 16 is a flash integrator circuit 32, the output of which is connected to the second contact 26 of the second switch 24. The center arm 28 of the second switch 24 is connected to a linear-to-logarithmic converter 34 which generates a signal that is provided to a summing node 36. The summing node 36 is in turn connected to a display 38. The exposure meter may also include an accessory program input 40 that is connected to the summing node 36.

A simplified description of the exposure meter operation may now be made with the reference to FIG. 1.

The sensor 10 generates a substantially linear signal that is proportional to the intensity of the light 12. When the link 30 is in a first position, the signal from the sensor 10 is conducted through the first switch 16 and the second switch 24 to the linear-to-logarithmic converter 34 where a signal proportional to the logarithm of the signal from the sensor 10 is generated. This signal is supplied through the summing node 36 to the display 38 which may directly indicate proper exposure data according to film speed or which may display an index number that the operator may use to manually operate a calculator to similarly determine exposure data. The logarithmic conversion of the linear signal from the sensor 10 allows the exposure meter to operate over a broad range of light intensities which may be, for example, a range of twenty-one.

When the link 30 is adjusted to its second position, the signal from the sensor 10 is supplied through the second contact 20 to the flash integrator 32. The flash integrator 32 integrates the signal from the sensor 10 over a selected period of time corresponding to a shutter speed which may be selected by means of, for example, a rotary switch thereby providing an exposure index. At the end of this time interval, the flash integrator 32 samples and holds the integrated value and provides an output signal proportional thereto to the second contact 26. This signal being an indicia representation of the exposure index is applied through the center arm 28 to the linear-to-logarithmic converter 34 and in turn to the summing node 36 and the display 38 which operate on this signal from the flash integrator 32 in a manner similar to that described above with respect to the signal from the sensor 10. In this way, the display 38 indicates an aperture setting according to a selected film sensitivity that is logarithmically proportional to the total amount of light 12 falling upon sensor 10 during the predetermined time period.

The accessory program input 40 accepts a compensation signal from accessories that may be used with the exposure meter. This signal is summed with the output signal from the linear-to-logarithmic converter 34 at the summing node 36 and the resulting signal is applied to the display 38. In this way, the correction signal from the accessory program input 40 corrects the exposure data displayed by the display 38 to compensate for a change in exposure meter sensitivity resulting from the optical characteristics of the accessory.

Having briefly described the present invention, a more detailed description thereof will now be presented with reference to FIG. 2A. The optical sensor 10 is positioned to receive incident light as indicated by the arrows 12. The output of the sensor 10 is connected to a continuous/flash switch 100 that includes the first switch 16 and the second switch 24 as described above with reference to FIG. 1. The center arm 28 of the second switch 24 is connected to a logarithmic amplifier 102. The output of the logarithmic amplifier 102 is applied to the summing node 36 and also to an over-under range detector 104. The output signal from the over-under range detector 104 is in turn applied to a display driver 108. The summing node is connected to an analog-to-digital converter 106 and the digital output from the analog-to-digital converter is applied through the display driver 108 to the display 38. In this embodiment of the exposure meter, two other inputs are applied to the summing node 36. A first input is from the accessory program input 40 and a second input is from an ASA potentiometer 110 through a switch 111.

With reference again to the continuous/flash switch 100, the link 30 between the center arms 13 and 28 of the first and second switches 16 and 24 is controlled by a continuous/flash shutter speed control 112 through a mechanical link 114. This control 112 may, for example, comprise a knurled thumb wheel into which is formed a letter C indicative of the "continuous" operating mode and also into which are formed a plurality of numerals indicative of various shutter speeds.

The control 112 is also mechanically connected through the mechanical link 114 to a shutter speed select switch 116. A first output 118 of the switch 116 is applied to the over-under range detector 104, the analog-to-digital converter 106, the analog-to-digital converter 106, the switch 111, and to a power off timer 120. A second output 122 from the shutter speed select switch 116 is applied to a timer 124.

The output from the timer 124 is applied to a switch 126, to a latch 128, to an integrator reset 130 and through a diode 131 to the power off timer 120, the analog-to-digital converter 106 and an inverter 121. Returning to the switch 126, the second contact 20 of the first switch 16 is connected to a first terminal 132 of the switch 126 which may be, for example, a solid state FET switch. A second terminal 136 of the switch 126 is connected to a differentiator 140, the output of which is applied to the latch 128. A third terminal 138 of the switch 126 is fed to an integrator 142. The signal developed by the integrator 142 is connected to a sample and hold 144 which in turn produces a signal that is applied through a voltage-to-current converter 146 to the second contact 26 of the switch 24. The signal from the latch 128 is applied to the timer 124 and to the sample and hold 144. The integrator reset 130 produces a signal that is applied to the integrator 142.

Directing attention now to the upper portion of FIG. 2A, the exposure meter of the present invention further includes a function switch 148. This function switch may comprise a thumb-operated lever that may be positioned by the operator into one of three positions, those positions being an "off" position, a "hold" position, and a "read" position. The hold position in a preferred embodiment is intermediate the off and read positions. The operating mode or functions performed by the exposure meter when the function switch 148 is in each of the three positions will be described subsequently. A first output 149a of the function switch is applied to a flash PC terminal 150 through which sources of flashed light such as photographic strobe lights maybe connected. A second output 149b from the function switch 148 is applied to the power off timer 120 and a third output 149c from the function switch 148 is applied to the analog-to-digital converter 106, the power off timer 120, and through the inverter 121 to the latch 128. A battery voltage comparator 152 provides a signal to the display driver 108. The description set out above with reference to FIG. 2A is for an embodiment of the present invention wherein the exposure data is presented to the operator by means of the display 38 which may be, for example, a LCD digital display. The embodiment of FIG. 2A, however, may be modified as shown with reference to FIGS. 2A and 2B to form an alternative to the embodiment of FIG. 2A wherein the exposure data is displayed to the operator by means of a rotating indicator dial. This alternative to a preferred embodiment of the exposure meter may be described by replacing a portion of FIG. 2A generally designated 156 as defined by the broken line 154 with the diagram of FIG. 2B. In this alternative embodiment, the area of FIG. 2A designated generally 158 is connected to the diagram of FIG. 2B by means of lines that are designated with the characters A through F.

Now with reference to the area 158 of FIG. 2A in combination with the diagram of FIG. 2B, the accessory program input 40 provides a signal to a summing node 170 and the first output 118 of the shutter speed select swith 116 is connected both to the power off timer 120 and to a servo driver 172. It will also be seen that the third output 149c from the function switch 148 and the diode 131 are applied to the power off timer 120, the inverter 121 the servo driver 172, and within the servo driver 172, a read release timer 175. The output from the logarithmic amplifier 102 is applied both to the over-under range detector 104 and to a sample and hold 174. The output of the over-under range detector 104 is applied to the servo driver 172 and the signal developed by the battery voltage comparator 152 is applied to a LED display 177. The power output from the power off timer 120 is also applied to the LED display 177. The output from the sample and hold 174 is applied to the summing node 170 and the signal that results from the summation that takes place there is applied to the servo driver 172 and, within the servo driver 172, to a set detector 179. The drive signals from the servo driver 172 are in turn applied to a servo motor 176 which is mechanically connected by means of a linkage 178 to both an indicator dial 180 and to a position potentiometer 182. The signal from the position potentiometer 182 is applied to the summing node 170. Several signals from the servo driver 172 are also applied to the LED display 176 and a sample and hold control line 173.

The operation of a preferred embodiment of the exposure meter according to the present invention will now be described with reference to FIG. 2A (areas 156 and 158) wherein the exposure data is indicated to the operator by means of a display 38. It is assumed initially that the continuous/ flash shutter speed control 112 is adjusted to the continuous or C setting, thereby positioning the center arms 13 and 28 of the switches 16 and 24 so as to contact the first contacts 18 and 22. Also it is initially assumed that the function switch 148 is adjusted to the "off" position. With the continuous/flash shutter speed control 112 set to the continuous or C position, the exposure meter will operate in the continuous mode and will display an exposure index number for continuous light sources.

Once the exposure meter is oriented so that the light 12 that is to be measured is falling upon the sensor 10, the lever of the function switch 148 is moved from the "off" position to the "read" position. When in the "read" position, the function switch provides power from a battery (not shown) to the power off timer 120 through the second output 149b and also provides a "read" signal on the third output 149c. The power off timer 120 in turn provides power throughout the exposure meter as required. With the continuous/flash shutter speed control 112 set to the continuous position, the shutter speed select switch 116 is adjusted by means of the mechanical link 114 to produce a continuous mode status signal on the first output 118 that indicates the meter is in the continuous mode, the purpose of which will be described subsequently with respect to the power off timer 120, the ASA potentiometer switch 111, the analog-to-digital converter 106 and the over-under range detector 104.

With the exposure meter thus adjusted to the continuous mode and with the function switch set to "read," the sensor 10 generates a signal that is proportional to the intensity of the light 12 falling upon the sensor. This signal is applied through the continuous/flash switch 100 by means of the first and second switches 16 and 24 to the logarithmic amplifier 102. Within the logarithmic amplifier 102, the linear signal from the sensor 10 is converted to an output signal that is logarithmically proportional to the level of the input signal. Thus, the output signal from the logarithmic amplifier 102 is logarithmically proportional to the intensity of the light 12 that falls upon the sensor 10. The logarithmic amplifier 102 is furthermore adjusted during the manufacture or repair of the exposure meter so that the logarithmic output signal is calibrated with respect to the intensity of the light 12. This logarithmic signal is applied to the summing node 36.

The logarithmic signal is also applied to the over-under range detector 104 which establishes an upper limit and a lower limit for the logarithmic signal. The upper and lower logrithmic signal limits establish a sensitivity range within which the exposure meter accurately operates. The over-under range detector 104 compares the logarithmic signal with the upper and lower limit and generates a signal that is provided to the display driver 108 when the logarithmic signal is above the upper limit or is below the lower limit. The display driver 108 in turn generates signals that are applied to the display 38 and which may operate, for example, a liquid crystal display means so as to cause the words "over" or "under" to become visible. In this manner, the exposure meter continually checks for over or under range operating conditions and operates the display 38 to inform the operator when such conditions exist. The upper and lower limits are adjusted according to the continuous mode status signal appearing on the first output 118, that is, a first set of limits are established when the first output 118 from the shutter speed select switch 116 indicates that the exposure meter is operating in the continuous mode and a second set of limits are established when the first output 118 indicates that the exposure meter is operating in the flash mode.

A second signal is provided to the summing node 36 from the accessory program input 40. Various optical accessories may be used with the exposure meter of the present invention and may include, for example, accessories that adapt the exposure meter more specifically for use in a studio environment or which limit the acceptance angle of the sensor 10 to thereby convert the exposure meter into a spot sensing meter. One such accessory is described with reference to FIGS. 10 through 15. However, as is well known to those skilled in the art, there may be transmission losses or gains that occur within the optical accessory. Recalling that the logarithmic signal at the output of the logarithmic amplifier 102 is calibrated to the intensity of the light detected by the sensor 10, it will be seen that any optical accessory transmission losses or gains will cause this calibrated relationship to become inaccurate and will result in similarly inaccurate exposure data displayed by the exposure meter. However, by means of the accessory program input 40, the exposure meter of the present invention provides a unique means for compensating for this transmission loss or gain. The particular transmission loss or gain associated with the optical accessory may be measured at the time of the manufacture of the accessory. The optical accessory may further include a means for generating a signal that is logrithmically proportional to the measured transmission loss or gain. This signal is provided through the accessory program input 40 to the summing node 36. As will be appreciated, this signal is summed at the summing node 36 with the logarithmic signal from the logarithmic amplifier 102 to thereby compensate the logarithmic signal for the transmission loss or gain that is associated with the optical accessory. In this way, the original adjustment of the logarithmic amplifier 102 that calibrated the exposure meter remains accurate and no recalibration by the operator need be performed when the optical accessory is used.

In addition, the limits established by the over-under range detector 104 that set the operating range for the sensor 10 and the logarithmic amplifier 102 need not be readjusted when an optical accessory is used with the exposure meter because the correction signal is summed with the logarithmic signal from the logarithmic amplifier 102 after the logarithmic signal is applied to the over-under range detector 104 and thus the compensation signal will have no effect on the range detection process accomplished therein. Additionally, since the transmission losses or gains associated with the optical accessory will be equal when the exposure meter is operated in either the continuous mode or the flash mode and since the flash integration process occurs within the exposure meter prior to the logarithmic amplifier 102, as will be subsequently made clear, it will be seen that the compensation signal compensates the logarithmic signal in either mode to provide an accurate result. Thus, an optical accessory may be used with the exposure meter in either the flash or continuous operating mode without recalibration of the exposure meter.

A third input to the summing node 36 is applied from the ASA potentiometer 110 through the switch 111. However, when the exposure meter is operated in a continuous mode, the continuous mode status signal from the shutter speed switch 116 that appears on the first output 118 causes the switch 111 to disconnect the ASA potentiometer 110 from the summing node 36, which thus disables the potentiometer 110 during this mode of operation.

The signal from the summing node 36, which is (in the continuous mode) the sum of the logarithmic signal from the logarithmic amplifier 102 and the compensation signal from the accessory program input 40, is applied to the analog-to-digital converter 106. This converter 106 is of conventional design as is well known in the art and is controlled by the signal that appears on the line 149c. When the signal indicates that the function switch is in the "read" position, that is, when the read signal is applied by the function switch 148, the analog-to-digital converter 106 continually generates a plurality of digital outputs indicated by the arrow 107 which, when taken together, are proportional to the magnitude of the signal received from the summing node 36. The continuous mode status signal on the first output 118 has no effect on the operation of the analog-to-digital converter 106 in the continuous mode. The digital signals are applied to the display driver 108 and in turn to the display 38 to produce a digital display that is proportional to the magnitude of the signal from the summing node 36. As with the converter 106, the display driver 108 and the display 38 are conventional in nature. The display driver 108 also receives signals from the over-under range detector 104 as has been previously described. The signals from the battery voltage comparator 152 are used to drive portions of the display 38 which indicate that the battery requires replacement or other maintenance, as will be described below.

It will thus be seen that to this point the exposure meter will measure the intensity of the light 12 and display a number by means of display 38 that is logarithmically proportional to the intensity of the light 12 as corrected by any optical accessory correction signal applied through the accessory program input 40. Once this process is completed, the function switch may be moved to the "hold" position, thereby removing the read signal from the read signal line 149c. When this read signal is removed from the analog-to-digital converter 106, the conversion process ceases and the digital signals appearing on the lines 107 are latched or held, causing the display driver 108 and the display 38 to retain a constant numerical display.

The read signal is also removed from the power off timer 120, which then begins a timing process. Once a predetermined time limit is reached which may, for example, be ninety seconds, the power off timer removes the power from its power output thereby removing power from the remainder of the exposure meter circuitry. When the exposure meter is operated in the continuous mode of operation, power off timer 120 is reset each time it receives a read signal and again applies power to the remainder of the exposure meter. When the read signal is removed from the power off timer after the power off timer is reset, the timing process begins again. Should the read signal be applied to the power off timer 120 before the time limit is reached, the timing process only is reset and will begin as previously described when the read signal is removed. Thus the power off timer 120 prolongs battery life by removing power from most of the exposure meter circuitry if the operator does not move the function switch 148 to the "read" position within that period of time. In addition, the power off timer 120 provides a time period within which a number of flashes may be accumulated by the exposure meter when operated in the flash mode as will be described below.

With the function set in either the "read" or "hold" position, the display 38 will show an index number that is then used by the operator to obtain shutter speed and aperture settings according to film sensitivity. This may be accomplished, for example, by means of a hand operated calculator dial which comprises a plurality of concentric disks onto which may be printed ASA and DIN numbers, exposure values, index numbers corresponding to this displayed by the display 38, aperture settings, and shutter speeds. Such calculators are well known in the art. The calculator is then rotated to the index number and a range of aperture settings and corresponding shutter speeds are then displayed for a given film sensitivity as set by the ASA or DIN number. Thus, in overall operation, the exposure meter measures the intensity of the light 12, generates an index number appearing on display 38, and, using this index number, the operator obtains a range of shutter speeds and corresponding aperture settings which will correctly expose a given photographic film. Additionally, since the operator is presented with an index number which is then used to set the hand operated calculator, the operator may modify the index number before the hand operated calculator is used. This capability to modify the index number may be useful, for example, in zone system exposure calculation techniques.

The battery voltage comparator 152 compares the voltage from the battery (not shown) to one or more preset limits. If the battery voltage falls below these limits, the battery voltage comparator 152 generates a signal or signals that are provided to the display driver 108 and in turn to the display 38. This causes a suitable indication to appear on the display 38 which may, for example, be the letters "BATT." The battery voltage limits may be set so that a first limit indicates that the battery has been drained to approximately 10% of its capacity but wherein the exposure meter readings remain accurate. This may be indicated, for example, by rapidly turning on and off the indication BATT upon the display 38. A second limit may be set which indicates that the battery has drained to a point where the exposure meter will no longer provide accurate results, and this may be indicated by constantly displaying the indication BATT by means of the display 38. Thus, the battery voltage comparator 152 provides a continuous check of the battery and decreases the likelihood that inaccurate exposure meter readings will be obtained.

The above description has been for the exposure meter when operated in a continuous mode. The exposure meter, however, may be adjusted for operation in the flash mode by setting the continuous/flash shutter speed control 112 to a position that indicates one of several shutter speeds. For the purpose of this explanation, it will be assumed that the control 112 has been set to a position that corresponds to a shutter speed of one-sixtieth of a second. In this position, the center arms 13 and 22 of the switches 16 and 24 are connected to the second contacts 20 and 26. The shutter speed select switch 116 is adjusted by means of the mechanical link 114 to remove the continuous mode status signal from the first output 118 (to thus generate a flash mode status signal), and to provide a signal on the second output 122 to the timer 124, which signal is indicative of the selected shutter speed.

The operation of the exposure meter in the flash mode will first be described with respect to the function switch 148 placed in the "hold" position. When the function switch 148 is moved from the "off" to the "hold" position, power from a battery (not shown) is supplied along the output 149b to the power off timer 120 which in turn applies power to the remaining circuitry of the exposure meter. The power off timer 120 also begins the timing function which, in this exemplary embodiment, is assumed to have a period of ninety seconds. When light 12 from a flashed light source is detected by the sensor 10, a signal from the sensor 10 proportional to the intensity of the light is directed through switch 16 to the first terminal 132 of the switch 126. The switch 126 is controlled by the output of the timer 124. When the timer 124 generates a timing gate signal, the switch 126 will connect the signal applied to the first terminal 132 to the third terminal 138 and in turn to the integrator 142. Otherwise, the signal at the first terminal 132 is applied through the second terminal 136 to the differentiator 140. Since there is no timing gate signal applied to the switch 126, the signal from the sensor appearing at the first terminal 132 is applied through the second terminal 136 to the differentiator 140.

It is known to those skilled in the art that a flashed light source used for photographic purposes emits a light flash that has a rapidity increasing intensity. A signal proportional to this rapidly increasing intensity is generated by the sensor 10 and is directed through the switches 16 and 126 to the differentiator 140. The differentiator 140 differentiates the signal and thereby provides an output that sets the latch 128 at the start of the flash from the flashed light source. The latch 128 in turn initiates the timer 124 that provides a timing gate signal to the switch 126, the latch 128, the integrator reset 130, the analog-to-digital converter 106, and the power off timer 120. The integrator reset 130, at the time that the power was originally applied through the exposure meter circuitry by means of the power off timer 120, reset the integrator 142 to clear from the integrator any previously stored signal value. The timing gate signal removes this clearing signal generated by the integrator reset 130 from the integrator 142. The switch 126, in response to the timing gate signal from the timer 124, connects the sensor signal that is applied to the first terminal 132 to the third terminal 138 and in turn to the integrator 142.

The integrator 142 integrates or sums the signal from the sensor 10. The output of the integrator 142 is applied to the sample and hold 144 which is controlled by the latch 128 to sample the signal from the integrator 142 during the time that latch 128 is set. The timer 124 by means of the signal from the shutter speed select switch 116 applied through the second output 122 is adjusted to produce the timing gate signal with a period corresponding to the shutter speed that is selected by the continuous/flash shutter speed control 112. Thus, the timing gate signal produced by the timer 124 when initiated by the signal from the latch 128 will have a period of one-sixtieth of a second. While this timing gate signal is applied to the switch 126, the integrator 142 will continue to sum or integrate the signal from the sensor 10. It will be noted that this signal will be proportional to the total light intensity falling upon the sensor 10 and that this light may include not only the light from the flashed light source but also any continous light from ambient sources.

Once the timer 124 determines that one-sixtieth of a second has passed since it was initiated by the signal from the latch 128, the timer 124 removes the timing gate signal from the switch 126, the latch 128, the integrator reset 130, the power off timer 120 and the analog-to-digital converter 106. The switch 126 then reconnects the first terminal 132 to the second terminal 136 and thus reconnects the sensor through the switches 16 and 126 to the differentiator 140. After a short delay, the latch 128 is reset, causing the sample and hold 144 to hold the value of the output signal from the integrator 142. The constant signal from the sample and hold 144 is then applied through a voltage-to-current converter 146 and through the switch 24 to the logarithmic amplifier 102.

The logarithmic amplifier 102 produces a logarithmic output signal which is logarithmically proportional to the constant signal from the sample and hold 144 and is thus logarithmically proportional to the output of the integrator 142. This logarithmic signal from the logarithmic amplifier 102 is thus logarithmically proportional to the total amount of light detected by the sensor 10 during the timing gate generated by the timer 124. This logarithmic signal is applied to the summing node 36 along with any optical accessory compensation signal that is applied through the accessory program input 40. The accessory program input 40 operates as previously described to compensate for any transmissionn loss or gain that may be associated with an optical accessory that is mated to the exposure meter.

It will be noted that the shutter speed selector switch 116 generates a flash mode status signal on the first output 118 and that this signal is applied to the switch 111. The switch 111 connects the signal from the ASA potentiometer 110 to the summing node 36. The signal from the ASA potentiometer is proportional to the film sensitivity as expressed in either ASA or DIN numbers and is manually adjusted to the correct film sensitivity as may be indicated, for example, by the ASA dial that is a part of the hand operated computer previously described. The magnitude of the signal from the ASA potentiometer 110 that is applied through switch 111 to the summing node 36 is such that the summation signal from the output of the summing node 36 that is applied to the analog-to-digital converter 106 is directly proportional to the aperture setting or f-stop number required to properly expose film having the selected ASA when the film is exposed to the same lighting conditions experienced by the sensor 10 during a period of time corresponding to the shutter speed selected by the control 112. This summation signal is applied to the analog-to-digital converter 106 along with the flash mode status signal from the first output 118. This first output signal 118, now indicating the flash mode of operation, enables the analog-to-digital converter 106 to convert the signal from the summing node 36 into a digital number that directly indicates f-stop number. This may be accomplished, for example, by means of a look-up table within the converter 106. The display driver 108 and the display 38 then process the digital signals in a manner similar to that described above resulting in a number displayed on the display 38 that is the required aperture setting. The timing gate signal from the timer 124 is applied to the analog-to-digital converter 106 and operates the converter 106 to convert the magnitude of the signal from the summing node 36 into corresponding digital outputs 107.

Once the flash integration cycle initiated by the differentiator 140 and timed by the timer 124 has been completed, it will be seen that the switch 126 again applies the signal from the sensor 10 to the differentiator 140, thus enabling the differentiator 140 to again detect signals from the sensor 10 that indicate the beginning of a flash from a flashed light source. The process described above is then repeated, allowing the integrator 142 to accumulate the total light 12 falling upon the sensor 10 for a series of flashes from one or more flashed light sources. This accumulated value is converted as previously described to an aperture setting that is displayed by the display 38. This manner of operation may be particularly advantageous, for example, when a series of sequential flashes are required to properly light a photographic subject. The period of time over which this accumulation process may proceed is limited by the power off timer 120 and may, for an exemplary embodiment be a period of ninety seconds.

Turning now to a description of the present invention in the flash mode of operation with the function switch 148 set to the "read" position, the function switch 148 generates a "read" signal on the output 149c that is inverted by the inverter 121 and applied to the latch 128. The read signal is also applied to the analog-to-digital converter 106, thereby initiating the conversion process as previously described. The function switch 148 also provides a short circuit between the inner and outer contacts of the flash PC terminal 150 through the output line 149a. As is well known, this short circuit will trigger a photographic flashed light source. This flashed light source provides a light flash that is processed by the circuitry as previously described, thereby displaying an aperture setting by means of the display 38. If the function switch is held in a "read" position, however, the read signal that is applied through the inverter 121 to the latch 128 prevents the latch 128 from resetting at the end of the timing gate signal from the timer 124. Since the latch 128 will not be reset, it will not be possible for the latch 128 to again be set by the differentiator 140 in response to additional light flashes as detected by the sensor 10. In this way, the exposure meter will only respond to the flashed light source triggered by means the flash PC terminal 150; successive flashes detected by the sensor 10 and the differentiator 140 will not be accumulated by the integrator 142 as was the case when the function switch 148 was in the "hold" position. This feature may be useful, for example, when it is desired to determine an aperture setting with respect to only one flashed light source of several that may illuminate the subject, as would occur when a number of photographers using flash light sources are photographing the same subject.

It is to be further noted that the flash mode status signal appearing on the output 118 from the shutter speed select switch 116 as applied to the power-off timer 120 inhibits both the read signal from the function switch and the timing gate signal from the timer 124, and thus prevents the timing function of the power off timer 120 from being reset. The power off timer 120 will apply power to most of the exposure meter circuitry for a predetermined period of time after the power is initially applied to the timer 120 from the function switch 148 and, once this predetermined time limit is exceeded, the power off timer 120 will remove the power from the remaining exposure meter circuitry as has been described above.

The flash mode status signal on the first output 118 is also applied to the over-under range detector 104 and serves to adjust the exposure meter range limits established there. The flash portion of the circuitry that has been described with respect to the operation of the exposure meter in the flash mode of operation operates linearly upon the signal from the sensor 10 and is thus not capable of the dynamic range that is possible when the sensor 10 provides its signal directly to the logarithmic amplifier 102 as is done when the exposure meter is operated in the continuous mode. To account for this decreased dynamic range, the limits established by the over-under range detector 104 are narrowed accordingly.

Once the exposure meter has responded to one or more light flashes, the circuitry may be reset by moving the function switch 148 to the "off" position and then moving the function switch 148 to either the "hold" or "read" position as desired. This procedure causes the power off timer 120 to first remove power from the integrator reset 130 and then to reapply power to the integrator reset 130, thereby resetting the integrator 142. The reset signal from the integrator 130 is then removed from the integrator 142 with the first timing gate signal from the timer 14.

Having thus described a preferred embodiment of the present invention with respect to FIG. 2A, an alternative to the embodiment of FIG. 2A will now be described wherein the exposure data is displayed by means of an indicator dial 180 (FIG. 2B). While a preferred embodiment described previously displays an index number that is then used to determine the desires exposure data, an alternative embodiment automatically rotates the indicator dial 180 to display the correct exposure data, thus providing an easy-to-use exposure meter that more quickly indicates the desired data.

With reference now to the portion of FIG. 2A designated generally 158 and to the diagram of FIG. 2B in combination, it is assumed that the continuous/flash shutter speed control 112 is set to the continuous position; thus, the exposure meter will operate in the continuous mode. Assuming first that the function switch 148 is set to the "off" position, when the function switch 148 is moved to the "read" position a read signal will appear on the output line 149c and will be applied to the servo driver 172 and to the read release timer 175. The servo driver in turn will apply a control signal by means of the line 173 to the sample and hold 174. The sensor 10, the continuous/flash switch 100, and the logarithmic amplifier 102 will function as previously described to provide a logarithmic signal to the sample and hold 174. The read release timer 175 generates a servo driver enable signal that allows the servo driver 172 to operate.

When in the continuous mode, the shutter speed select switch 116 provides a continuous mode status signal on the first output 118 to the servo driver 172. This continuous mode status signal gates the read signal from the function switch 148 that is applied to the servo driver 172 onto the line 173 and thus to the sample and hold 174. When the read signal is applied to the sample and hold 174 in this manner, the sample and hold 174 provides an output signal to the summing mode 170 that follows the logarithmic signal from the logarithmic amplifier 102. However, when the read signal is removed from the sample and hold 174, the sample and hold then "holds" an output signal that is applied to the summing mode 170, which output signal is equivalent to the logarithmic signal from the logarithmic amplifier 102 at the time that the read signal was removed. Also, there may be applied to the summing node 170 a compensation signal from an optical accessory by means of the accessory program input 40 as previously described. A third signal applied to the summing node 170 is generated by the position potentiometer 182, the purpose of which will be subsequently explained.

It will now be apparent that the sum of the signals from the sample and hold 174 and the accessory program input 40 are equivalent to the summed signal from the summing node 36 of the embodiment described with respect to only FIG. 2A. As there described, that same signal was converted by means of a analog-to-digital converter 106 and a display driver 108 so as to display an index number on the display 38 which was then used to rotate a hand-operated calculator in order to determine the correct exposure data. However, with respect to the alternative embodiment described with reference the portion generally designated 158 of FIG. 2A in combination the diagram of FIG. 2B, it will be explained that the sum of these two signals is used to position the indicator dial 180 by means of a closed servo loop that generally comprises the summing node 170, the servo driver 172, the servo motor 176, linkage 178 and the position potentiometer 182. The indicator dial 180 is generally similar to the hand-operated calculator dial previously described and is initially adjusted so as to correspond to a given film sensitivity by means of ASA or DIN numbers. The indicator dial 180, in contrast to the hand-operated calculator, need not be rotated by hand to match an index number but is, instead, automatically rotated by means of the closed servo loop to display the correct exposure data.

With reference now primarily to FIG. 2B, the operation of the closed servo loop will be described. The position potentiometer 182 generates a signal that is proportional to the position of the linkage 178 and is thus proportional to a position of the indicator dial 180. The linkage 178 may, by way of example, be the shaft of the servo motor 176. This feedback signal from the position potentiometer 182 is applied to the summing node 170 along with the signals from the sample and hold 174 and compensation signal that may be applied through the accessory program input as was described previously. The result of the summation performed at the summing node 170 is a servo drive difference signal that is in turn applied to the servo driver 172 and which causes the servo driver 172 to provide a rotational control signal to the servor motor 176, thus rotating the servo motor 176, the linkage 178 and the indicator dial 180 in the direction necessary to display the appropriate exposure data on the indicator dial 180. The position potentiometer 182 continues to sense the position of the linkage 178 and, when the linkage 178 and the indicator dial 180 are in the required position, the feedback signal from the position potentiometer 182 is such that, when summed at the summing mode 170, the resulting servo drive difference signal no longer causes the servo driver 172 to provide a control signal to the servo motor 176. Thus, the rotation of the linkage 178 and the indicator dial 180 ceases. The set detector 179 detects this condition and provides a signal to the LED display 177, as explained below. Should the output from the sample and hold 174 or the signal from the accessory program input 40 change, a servo drive difference signal will again be generated at the summing node 170, and the above-described process will be repeated so as to correctly position the indicator dial 180.

If the function switch 148 is moved from the "read" position to the "hold" position, the read signal that is applied to the sample and hold 174 will be removed and the sample and hold will maintain its output signal applied to the summing node 170. When the read signal is removed from the read release timer 175, the read release timer continues to generate the servo driver enable signal for a length of time which may, for example, be approximately three seconds to allow the closed servo loop to position the indicator dial 180 as previously described.

The servo driver 172 may generate several signals that are applied to the LED display 177. The LED display 177 may comprise, for example, four light emitting diode (LED) indicators. A first such LED indicator may be driven by the set detector 179 to indicate that the closed servo loop has adjusted the indicator 180 to the proper position, and this LED indicator may be labeled "SET".

The over-under range detector 104 will produce signals indicating that the logarithmic signal at the output of the logarithmic amplifier 102 has exceeded certain preset limits and these signals are applied to the servo driver 172 to prevent the servo driver 172 from attempting to drive the servo motor 176, the linkage 178 and the indicator dial 180 beyond predetermined rotational limits. These over-under signals are also used to develop a second signal from the servo driver 172 that is applied to the LED display 176 to illuminate a second LED indicator that may, for example, be designated "RANGE" to denote that the lighting conditions sensed exceed the range of the exposure meter.

With respect now the operation of the alternative embodiment of the exposure meter in the flash mode and with further reference to the portion 158 of FIG. 2A and the diagram of FIG. 2B, the portion of FIG. 2A designated 158 operates generally as described previously and need not be further detailed here.

Turning now primarily to FIG. 2B, when the flash mode status signal from the shutter speed select switch 116 is applied to the servo driver 172, the sample and hold control line 173 is controlled by means of the power from the power off timer 120. This signal appearing on the sample and hold control line 173 operates the sample and hold 174 to continuously provide a signal equivalent to the logarithmic signal at the input of the sample and hold 174 to the summing mode 170. As a result, the indicator dial 180 will be continually adjusted by means of the servo driver 172, the servo motor 176 and the linkage 178 during the timing period of the power off timer 120. This timing period may be, for example, ninety seconds. Once the time period of the power off timer 120 ends, a timing means (which is included in the read release timer 175) may be provided to allow a short time period which may be, for example, approximately three seconds in order for the closed servo loop to adjust the indicator dial 180.

It will be observed that the embodiment illustrated in FIG. 2B does not include an ASA potentiometer 110 as is indicated in the area 156 of FIG. 2A. As will be remembered, however, the ASA for the particular photographic film in use is initially set into the indicator dial 180; thus, a signal equivalent to that developed by the ASA potentiometer 110 is not required.

For either flash or continuous modes of operation, the signal or signals from the battery voltage comparator 152 generated as previously described are applied to the LED display 176 and thereby illuminate, for example, a LED indicator which may be designated "BATT". It will be further observed that power from the power off timer 120 may also be applied to the LED display 176 and may similarly illuminate an indicator which may be designated "ON". It will be realized that the LED indicators described herein do not limit the possible indications that may be provided, nor are these indications meant to limit the operation of the present invention.

The above-description has been with respect to the diagrams of FIGS. 2A and 2B. Now with reference to the remaining FIGS. 3 through 6, a detailed description of circuitry that may be used to implement a preferred embodiment of the present invention will be provided.

Turning in particular to the diagrams of FIGS. 3 and 4, the exposure meter of the present invention having a digital display and a hand-operated exposure calculator as operated in the continuous mode will now be described.

It is initially assumed that the function switch 148 (FIG. 4) is adjusted so that a sliding contact 301 of the switch 148 connects together three contact 303a, 303b, and 303c. This places the function switch 148 into the "read" position and applies the positive terminal from a battery (not shown) through the contact 303a to the remaining contacts 303b–303c. The battery voltage may, for example, be nine volts. The battery negative terminal is connected to the common (COM) line 351. The battery voltage applied to the terminal 303b is, in turn, applied to the power off time 120 by means of a line 149b that corresponds to the output line 149b of FIG. 2A. The battery voltage applied to the terminal 303c corresponds to the read signal applied along the line 149C of FIG. 2A. This read signal is also applied to a power off timer 120. The power off timer 120 is shown as a block in FIG. 4 and includes circuit elements that are well known in the art to provide the previously described timing functions. The power off timer 120 then provides +V power throughout the exposure meter circuitry.

It is also assumed that the continuous/flash shutter speed control 112 positions the shutter speed select switch 116 and two DPDT switches 204 and 226 by means of the linkage 114 as will now be described. The switches 204 and 226 generally comprise the continuous/flash switch of FIG. 2A. It is further assumed that a sliding contact 201 (FIG. 3) of the switch 116 is moved to a position 203 as shown by a broken outline. In this position, the switch 116 adjusts the exposure meter for continuous mode and provides a +V output signal on the continuous line 118 at a terminal 205. This continuous signal is applied variously throughout the exposure meter circuitry as will be subsequently explained. It is additionally assumed that center arms 208 and 230 of the switches 204 and 226, respectively, are positioned by means of a mechanical link 30 to positions indicated by the dashed lines connecting a switch common terminal 210 and 232 with two second contacts 202 and 224.

The light indicated by the arrows 12 (FIG. 3) that is to be measured by the exposure meter, is directed to the sensitive surface of a photo diode sensor 10. The cathode of the diode 10 is connected to the second contact 202 of the switch 204. The switch 204 further includes a second contact 206 and the center arm 208 that is coupled to the switch common terminal 210. The switch common terminal 210 is in turn connected to a terminal 212 to the output of a unity gain amplifier 213 which includes an operational amplifier 214, resistors 216 and 218, and capacitors 220 and 222. The unity gain amplifier generally designated 212 buffers the ground line that is applied to the cathode of the diode 10 as will be subsequently explained.

The anode of the diode 10 is applied to the contact 206 and also to the contact 224 of switch 226. Switch 226 further includes a second contact 228 and center arm 230 is shown connected to switch common terminal 232. The switch common terminal 232 is connected by means of the Iin terminal 234 to an Iin terminal 366 of a log converter and calculator chip 300 (FIG. 4). The calculator chip 300 will be further explained with reference to FIG. 6. The calculator chip 300 also generates the analog common at a terminal 362 that is applied to the unity gain amplifier 213 (FIG. 3) through a terminal 302. This analog common will be described herein as phi and appears in the drawings as the symbol. The calculator chip 300 (FIG. 4) generates a signal at its B terminal 388 that is logarithmically proportional to the current applied through the Iin terminal 366. This logarithmic signal at the B terminal 388 is applied through a gain adjust potentiometer 304 and a resistor 306 to an ADD terminal 378 of the calculator chip 300. There, a signal from a zero adjust potentiometer 308 which is applied to the ADD terminal 378 through a resistor 310 is summed with the logarithmic signal applied thorugh the resistor 306 to provide an output at a −EV terminal 384 of the calculator chip 300 that is logarithmically proportional to, and calibrated with respect to, the current flowing through the diode 10. A resistor 312 provides feedback from the −EV terminal 384 to the ADD terminal 378 of the calculator chip 300.

Thus, in the continuous mode of operation, the center arms 208 and 230 of the switches 204 and 226 are in contact with the contacts 202 and 224, as is illustrated by the dashed lines of FIG. 3. The unity gain amplifier 213 provides current through the switch 204 to the cathode of the diode 10 and current from the diode 10 in proportion to the intensity of the light 12 then flows through the switch 226 to the Iin terminal 366 of the calculator chip 300. A logarithmic signal which is logarithmically proportional to this current and that is calibrated with respect to the sensitivity of the diode 10 is then provided at the output terminal −EV 384 of the calculator chip 300.

The continuous signal from the terminal 205 is applied to the inverting input of a comparator 314 (FIG. 4) and to the power off timer 120. The non-inverting terminal of the comparator 314 is connected to the phi terminal 362 of the calculator chip 300. The comparator 314 inverts the level of the signal appearing on the continuous line 118 and applies this inverted output to a control terminal 337a of the switch 111. The continuous signal applied to the power off timer 120 gates the read signal to the power off timer 120 as previously described. The switch 111 is, in this exemplary embodiment, a solid state field effect transistor (FET) switch as is well known in the art.

The calaculator chip 300 also provides a reference voltage from a terminal Vref 372 that is used throughout the exposure meter. This Vref voltage is applied through a potentiometer 316 to one side of the ASA potentiometer 110. The second side of the potentiometer 110 resitive element is connected to the movable contact of a potentiometer 318. One side of the resistive element of the potentiometer 318 is connected to the phi terminal 362 of the calculator chip 300. The opposite side of the potentiometer 318 resistive element is connected to the output of an operational amplifier 320 which, in combination with a potentiometer 322 and a resistor 324, provide a reference voltage both to the potentiometer 318 and to the accessory program resistor, as will be described below. A resistor 325 connects the output of the operational amplifier 320 to the common line 351.

With reference to the ASA potentiometer 110, the movable center contact thereof is connected through a resistor 326 to an input terminal 337b of the switch 111. An output terminal 337c of the switch 111 is connected to a point 36 that may be considered the summing node 36 for the purposes of this explanation. The output at the −EV terminal 384 of the calculator chip 300 is applied through a resistor 328 to the summing node 36. If an optical accessory is being used, the reference voltage developed by the operational amplifier 320 is applied through the accessory program input 40 by means of a first terminal 330. The optical accessory 332 may include, for example, a resistor 314 that provides a compensation signal through a terminal 336 of the accessory program input 40 to the summing node 36. In the continuous mode, however, the continuous signal, as inverted by the comparator 314, disconnects the ASA potentiometer 110 signal by means of the switch 111 from the summing node 36. Thus, in the continuous mode, the summing node 36 sums the signals from the −EV terminal 384 from the calculator chip 300 and from the accessory 332 through the accessory input 40 to provide an input signal to the analog-to-digital convertor 106. As previously noted, the analog-to-digital converter 106 is of a conventional design and may, for an exemplary embodiment be a dual slope convertor. A reference signal for the converter 106 is provided from the Vref terminal 372 of the calculator chip 300 by means of a series connected resistor 338 and potentiometer 340.

The over-under range detector 104 of FIG. 2A is implemented as shown with reference to FIG. 4 with a FET transistor 342, resistors 344, 346, 348, 350, 354, 356 and comparators 358 and 360. With the continuous signal applied through the terminal 205 through the resistor 348 to the gate of the FET transistor 342, the FET transistor 342 is in a non-conduction state and the voltage divider, comprising the resistors 344 and 346 in parallel with series-parallel combination of resistors 350, 354 and 356, establish the upper and lower range limits for the logarithmic signal from the −EV terminal 384 of the calculator chip 300. The lower range limit signal is applied from the junction of the resistors 344, 346 and the drain terminal of the FET transistor 342 to the non-inverting terminal of the comparator 358. Similarly, an upper range limit developed at the junction point of the resistors 346, 354 and 356 is applied to the inverting terminal of the comparator 360. The logarithmic signal from the −EV terminal of the calculator chip 300 is applied to the inverting terminal of the comparator 358 and to the non-inverting terminal of the comparator 360. When the logarithmic signal from the calculator chip 300 falls below the lower range limit, the comparator 358 generates a low level signal indicating that an under range condition exists. In a similar manner, when the logarithmic signal exceeds the upper limit signal, the comparator 360 generates a low level signal indicating that an over range condition exists. When the continuous signal no longer appears at the gate of the transistor 342 as applied to the resistor 348, the transistor 342 conducts and decreases the voltage drop across the resitor 346, thereby narrowing the upper and lower range limits as is required for the flash mode of operation. The signals from the comparators 358 and 360 are applied to the display driver 108 as described with reference to FIG. 2A.

When the function switch 148 (FIG. 4) is moved to the "hold" position, the sliding conductor 301 of the switch 148 will be moved toward the terminal 303a and will no longer be in contact with the terminal 303c thus removing the read signal from the read line 149c. However, in the hold position, the sliding conductor 301 will connect the contacts 303a and 303b so as to continue to provide power to the power off timer 120. As previously described, once the read signal is removed from the analog-to-digital converter 106, the convesion process will cease, resulting in a constant numerical indication on the display 38 (FIG. 2A). Additionally, the timing function of the power off timer 120 will commence as previously described.

To briefly summarize the operation of the circuitry in FIGS. 3 and 4 when the exposure meter is operated in the continuous mode, the diode 10 provides a signal to the calculator chip 300 which generates an output at the −EV terminal 384 that is logarithmically proportional and calibrated to the intensity of the light 12. The logarithmic signal is applied to the over-under range comparators 358 and 360 and is additionally applied through the isolation resistor 328 to the summing node 36. A correction signal from the optical accessory 332 that may be used with the exposure meter is also applied to the summing node 36. The signals are summed and are applied to the analog-to-digital converter 106, resulting in a numerical index number displayed by the display 38.

Turning now to a discussion of the exposure meter of the present invention in the flash mode and in particular with reference to FIGS. 3 and 4, it is initially assumed that the function switch 148 is in the "hold" position, that is, the sliding contact 301 connects the battery power applied to the contact 303a with the contact 303b which, in turn, applies battery power along the line 149b to the power off timer 120. It is also assumed that the continuous/flash shutter speed control 112 (FIG. 3) has adjusted the sliding contact 201 and the switches 204 and 226 so that the contact 201 is in the position 207 and the center arm 208 and 230 connect the contacts 206 and 228 with the switch terminals 210 and 232, respectively. With these initial conditions established, the exposure meter is in the flash mode of operation and will accumulate sequential flashes as described previously.

In reference now in particular to FIG. 3, the anode of the diode 10 is applied through the contact 206, center arm 208, and switch terminal 210 to the output of the unity gain amplifier 213. The diode 10 cathode is connected to the input terminal 236a of the switch 126. The switch 126 is a solid state FET switch similar to the switch 111 described with respect to FIG. 4. The switch 126 (FIG. 3) is controlled by a control termminal 236b. When a first low-level signal is applied to the terminal 236b, the input terminal 236a is conected to a first output terminal 236c. Conversely, when a high-level signal is applied to the control terminal 236b, the switch 126 connects the input terminal 236a with a second output terminal 236d. The signals that control the switch 126 are provided by a timer 238 as will be described in due course. The timer 238 in its initial condition provides a low-level signal to the control terminal 236b of the switch 126, and thus the signal from the cathode of the diode 10 is connected from the input terminal 236a to the first output terminal 236c and in turn to the inverting input of an operational amplifier 240 and to a resistor 242 and a capacitor 244 that form a feedback path for the operational amplifier 240. The non-inverting terminal of the operational amplifier 240 is connected through resistor 244a to the phi output of the unity gain amplifier 213. This output will be referred to hereinafter as the buffered phi line. The operational amplifier 240 converts the current from the diode 10 into a proportional voltage and also serves to maintain zero volts across the diode 10 so as to not change the internal capacitance of the diode 10. This is accomplished in the continuous mode by the calculator chip 300. The amplifier 240 and the calculator chip 300 also serve to minimize the diode 10 dark current.

The output of the operational amplifier 240 is applied to a capacitor 246 and inturn to a resistor 248 which is connected to the buffed phi line. The capacitor 246 and the resistor 248 form a differentiator which detects a rapidly changing signal from the diode 10 in response to a flash of light from a flashed light source. The junction between the capacitor 246 and the resistor 248 is connected to the non-inverting input of a comparator 250. A threshhold signal is established at the inverting input of the comparator 250 by means of a resistor voltage divider comprising a resistor 252 connected from +V to the inverting input and a resistor 254 connected from the inverting input to the phi ground. A filter capacitor 253 is connected across the resistor 252. A resistor 256 provides feedback from the output of the comparator to the non-inverting comparator input and a second resistor 258 provides pull-up voltage from +V to the comparator 250 output.

The output of the comparator 250 is applied to a set input 259a of a latch 261 formed by NOR gates 260 and 262. Feedback from the output of the gate 260 is applied to the gate 262 by means of a resistor 264 and feedback from the gate 262 is provided to the gate 260 through a resistor 266. A capacitor 268 connects the resistor 264 and the gate 262 to +V to provide power-up reset. The output of the latch 261 from the gate 260 is applied to an input of the timer 238 and is also applied to a control terminal 270a of a solid state switch 272. The solid-state 272 is similar to the switch 126 and the remaining connections will be subsequently described.

With reference now to the timer 238, a first output 239a provides to a reset input 273a of a latch 271 formed by the NOR gates 274 and 276. The output 239a of the timer 238 is a non-inverting output and is also applied through a diode 278 to a second set input 259b of the gate 260. The output 239a from the timer 238 is furthermore applied to the control input 236b of the switch 126 and is also applied through the diode 131 to the read line through a terminal 280.

A non-inverting output 239b of the timer 238 is connected through a diode 282 to a reset input 259i of the latch 261. Also connected to the reset input 259c is a timing circuit comprising the resistor 284 connected from +V to the reset input 259c, and a capacitor 286 connected from the reset input 259c to the common line 351. The read line 149c (FIG. 4) is applied to FIG. 3 through the terminal 280 and is, in turn, applied to the inverting input of a comparator 290. The non-inverting input of the comparator 290 is connected to the Vref output 372 from the calculator chip 300. The comparator 290 here functions as an invertor and applies an inverted read signal to the reset line 259c of the latch 261.

The time period for the timer 238 is set by means of a series of resistors 292a through 292f, the switch 116 and a capacitor 294. The resistors 292a-f are connected to a first timing terminal 239c of the timer 238. A series of switch contact 116a through 116f are correspondingly connected between successive resistors 292a-f so as to provide a incrementally increasing resistance between the first timing terminal 239c and a second timing terminal 239d when the sliding contact 201 is moved from a first position 207 through a third position 207a. The capacitor 294 is connected from the secnd timing terminal 239d to a third timing terminal 239e to complete the time determining circuitry. As the sliding contact 201 is moved from the position 207 to the third position 207a, the incrementally increasing resistance controls the time period of the timer 238 so as to correspond to a plurality shutter speed which may be, for example, 1/15 of a second, 1/30 of a second, and so on.

The operation of the above-described circuitry of FIG. 3 will now be presented. The signal from the diode 10 is applied to the input terminal 236a of the switch 126. Initially, the timer 238 applies a low-level output signal on the non-inverted output line 239a to the control terminal 236b of the switch 126. The switch 126 in turn applies the diode 10 signal to the operational amplifier 240. The operational amplifier 240, the differentiator formed from the capacitor 246 and the resistor 248, and the threshhold comparator 250 detects a rapidly chaging signal from the diode 10 which is proportional to the rapidly increasing light intensity associated with the leading edge of a light flash from a flashed light source. The comparator 250, as a result, applies a set signal to the latch 261 which in turn applies an input to the timer 238 and a control signal to the switch 272. The timer 238 then begins its timing operation during which the non-inverted output 239a provides a high-level signal to the switch 126 and also applies a set signal through the diode 278 to a second set input 259b of the latch 261. The inverted output 239b from the timer 238 applies a low-level signal to the diode 282 and in turn to the reset input 259c of the latch 261, thus discharging the timing capacitor 286. Once the timer 238 reaches the end of its time period as determined by the resistor 292, the switch 116 and the capacitor 294, the non-inverted output 239a becomes a low-level signal and the output 239b becomes a high-level or open signal. During the time that the non-inverted output 239a was a high-level signal, the switch 126 connects the input terminal 236a to the second output terminal 236d and in turn to an operational amplifier 296. Once the output 239a again became a low-level signal the switch 126 connects the input 236a to the first output 236c. Further, once the inverted output 239b of the timer 238 became an open or high-level signal, the resistor 284 gradually charges the capacitor 286 and, upon reaching a predetermined level, applies a reset signal to the reset input 259c of the latch 261, thus resetting the latch 261. It will be observed that a time delay established by the time constant of the resistor 284 and the capacitor 286 provides a predetermined time delay from the end of the timing period of the timer 238 until the moment that the latch 261 is reset. The purpose of this delay will be subsequently explained.

Again, with reference to FIG. 3, the signal from the second output 236d of the switch 126 is applied to the non-inverting input of the operational amplifier 296. An integrating capacitor 298 is provided as feedback between the output of the amplifier 296 and the inverting input thereof. This integrating capacitor 298 is the primary integrating capacitor and provides the integrating function as will be described. A bias current compensation resistor 297 is connected from the buffered phi line to the non-inverting input of the amplifier 296.

The overall operation of the circuitry of FIG. 3 will now be described. When power is initially applied to the exposure meter by means of a function switch 148 and the power off timer 120 (FIG. 4), the capacitor 243 in cooperation with the resistors 245 and 247 reset the latch 271 to provide a control signal to the switch 231. With the control signal applied in this fashion, the switch 231 connects the terminals 233a and 233b, thereby discharging the integrating capacitor 298 and resetting the integrator formed by the integrator capacitor 298 and the amplifier 296. When a first light flash is detected by the diode 10, the latch 261 will be set as described above and will provide a signal to the timer 238 and the switch 272. The timer 238 will begin its timing period and will set the latch 271 through the set input 273a, removing the control signal from the switch 231 and, thus, disconnecting the contacts 233a and 233b. Additionally, the control signal applied to the switch 272 will connect the capacitor 239 to the buffered phi line through the second output 270d. It will also be remembered that the signal from the diode 10 is now applied through the switch 126 to the amplifier 296 which, with capacitor 298, forms an integrator. As the summed signal accumulates at the output of the amplifier 296, this signal is also applied through the resistor 237 to the holding capacitor 239. Thus, as the summed signal proportional to the total light falling upon the diode 10 is developed at the output of the amplifier 296, this summed signal is also applied to the holding capacitor 239.

When the timer 238 completes its time period, the signal from the diode 10 will be disconnected from the amplifier 296 by means of switch 126. It will be remembered that the latch 261 is reset after a predetermined delay which follows the end of the timer 238 time period. This predetermined delay allows the holding capacitor 239 to substantially charge to the level of the output signal of the amplifier 296 through the resistor 237. Once the latch 261 is reset, the switch 272 will connect the resistor 237 and the holding capacitor 239 across the integrating capacitor 298. In a preferred embodiment, the integrating capacitor 238 may, for example, be 0.18 uF and the holding capacitor may have a value of, for example, 10 uF. The integrating capacitor 238 preferably is of a type having a low leakage current characteristic, that is stable with respect to temperature which may be, for example, a capacitor employing mylar. As will be appreciated by those skilled in the art, the relatively small value of the integrating capacitor 298 dictated by the transfer function which the capacitor 298 implements will cause the output of the integrator formed by the amplifier 296 and the capacitor 298 to gradually drift with the passage of time. However, because the holding capacitor 239 has a substantially greater capacity than the integrating capacitor 298, this drift will become negligable and the output of the integrator 299 will be substantially stable over the entire accumulation period as established by the power off timer 120. The exposure meter is capable of accumulating a series of light flashes over a suitable period of time while retaining negligable output drift during that period. Furthermore, the integrator and sample-and-hold circuit formed by the amplifier 296, capacitor 298, resistor 237, capacitor 239 and switch 272 are relatively easily implemented and do not require a series of amplifier stages.

It will be noted that the circuitry convert the input signal from the diode 10 that is a current proportional to light intensity to a voltage at the output of the amplifier 296 that is proportional to the integrated magnitude of the current from the diode 10 during the timing periods established by the timer 238. This voltage at the output of the amplifier 296 is applied through a voltage-to-current converting resistor 241 and through the switch 226 to the Iin terminal 366 of the calculator chip 300 (FIG. 4).

When the exposure meter is operated in the flash mode, the circuitry of FIG. 4 operates generally as described above. Several differences are to be noted. The signal from the movable contact of the ASA potentiometer 110 as applied through the resistor 326 is connected by the switch 111 to the summing node 36. Thus, the summing node 36 sums the signals from the calculator chip 300 as applied through the resistor 328, from the ASA potentiometer 110, and from the accessory 332 through the accessory program input 40. As was described above, the FET transistor 342 is turned on when the continuous signal is no longer on the continuous line 118 and thus the over-under range circuitry including the comparators 358, 360 is readjusted to narrow the upper and lower limits for the signal from the −EV terminal 384 of the calculator chip 300. The timing gate signal from the non-inverted output 239a of timer 238 is applied through the diode 131 through the analog-to-digital converter 106 as was described with reference to FIG. 2A.

When the function switch 148 is set to the "read" position, the read signal applied to the comparator 290 (FIG. 3) causes the comparator 290 to hold the reset input 259c at a low level. Thus, the latch 261 will not be reset through the delay circuit comprising the resistor 284 and the capacitor 286 when the inverting output 239b of the timer 238 assumes an open or high-level condition after the timer 238 completes its timing cycle. In this way, the circuitry of FIG. 3 will respond to a single light flash and will not accumulate successive flashes.

It is to be observed that once the calculator chip 300 is adjusted by means of the potentiometers 304 and 308 so as to produce an output at the −EV terminal 384 that is calibrated to the sensitivity of the diode 10, no further adjustment of this linear-to-logarithmic conversion circuitry is required when the exposure meter is adjusted from the continuous mode to the flash mode. When the exposure meter is operated in the flash mode, the integrated and the associated circuitry simply introduce a known transfer function between the diode 10 and the calculator chip 300 and, thus, no readjustment of the conversion process accomplished by the calculator chip 300 is necessary.

When the function switch is set to the "off" position, a sliding contact 305 shorts the line 149b and 149c through two contacts 307a and 307b, thereby discharging capacitor means within power off timer 120, thus clearing the timing function.

The exposure meter of the present invention may also be implemented in an alternative to the preferred embodiment as was previously described with reference to the area of FIG. 2A generally designated 158 and the diagram of FIG. 2B. In this embodiment, an indicator dial 180 is driven by means of a servo motor 176 (FIG. 2B) whereby the indicator dial 180 directly displays exposure date.

In this alternative embodiment, the calculator chip 300 (FIG. 5) processes the signal applied to the Iin terminal 366 and provides an output that is logarithmically proportional to at the output at the B terminal 388. This output is applied through a potentiometer 304 and a resistor 306 to the ADD terminal 378 of the calculator chip 300. As was previously described with reference to FIG. 4, this signal was summed with a zero adjust signal from the potentiometer 308 and the resistor 310. However, in this alternative embodiment, the −EV terminal 384 output operates as a sample and hold circuit controlled by the input applied by the B/T terminal 382 from the servo driver 172 by means of the sample and hold control line 173. When the sample and hold line 173 becomes a low-level signal, the signal at the −EV terminal 384 is held. This function corresponds to the sample and hold 174 of FIG. 2B. A pull-down resistor 307 connects the −EV terminal 384 to the common line 351. The −EV terminal 384 is connected to the summing node 170 through two resistors 403 and 405.

The position potentiometer 182 (FIG. 5) provides a signal that is proportional to the position of the linkage 178 through a resistor 400 to the summing node 170. A reference voltage from the operational amplifier 320 is applied to one side of the potentiometer 318 and is in turn applied through a resistor 402 to the terminal 330 of the accessory program input 40. A resistor 404 connects the terminal 330 to the phi terminal. The compensation signal from the accessory 332, if applied, is connected through the terminal 336 to the summing node 170. These signals are summed and applied through a servo amplifier contained within the calculator chip 300 as will be illustrated with respect to FIG. 6. The output of the servo amplifier is applied through the terminal OUT 1 392 of the servo amplifier 300 to the remaining circuitry of the servo driver 172. The resistor 406 provides feedback from this output to the summing node 170 for the servo amplifier.

The LED display 176 of FIG. 2B generally comprises four inverting buffers 432a-d (FIG. 5) light emitting diodes (LEDs) 434a-d, and four current limiting resistors 436a-d. The LIMIT LED 434a and the SET LED 434b are illuminated by signals from the servo driver 172. The ON LED 434c and the BATT LED 434d operation will be subsequently explained.

The remaining circuitry of FIG. 5 operates as previously indicated with reference to FIG. 4 and will not be further described. The circuitry of FIG. 3 for this alternative to a preferred embodiment is similar to that previously described.

Thus, in operation (FIGS. 3 and 5), a signal directly from the diode 10 in a continuous mode or from the resistor 241 in the flash mode is applied to the Iin terminal 366 of the calculator chip 300 (FIG. 5). A logarithmic signal that is proportional and calibrated with respect to the sensitivity of the diode 10 is generated at the −EV terminal 384 of the calculator chip 300 and, when the servo drive 172 generates a low-level signal along the sample and hold control line 173, and the −EV terminal 384 output is held at a constant value. This signal is summed with the feedback signal from the potentiometer 182 and with a correction signal from an accessory 332, if required. The signals are applied to generate a servo drive difference signal at the summing node 170 which is applied to a servo amplifier within the calculator chip 300 which produces an output OUT 1 392 that is applied to the servo driver 172. It will be observed that the servo amplifier that is part of the calculator chip 300 was included as part of the servo driver 172 of FIG. 2B. The servo driver 172 and the servo motor 176 then cause the indicator dial 180 to rotate as was described above with particular reference to FIG. 2B.

The calculator chip 300 (FIGS. 4 and 5) is generally similar to the chip described in U.S. Pat. No. 4,192,586 to Orban (Ser. No. 597,479, filed July 21, 1975, Notice of Allowance dated Aug. 21, 1979). Therein is presented a detailed explanation of the linear-to-logarithmic conversion process emloyed by the calculator chip 300 and reference may be made to the Orban Patent for a more thorough understanding of that conversion process and related functions performed by the calculator chip 300. However, the calculator chip 300 of the present invention has been slightly modified and thus a brief description of the calculator chip 300 will be made with reference to FIG. 6.

The calculator chip 300 includes a regulator 500 that provides a Vref voltage at the terminal 372. The Vref voltage may, for example, have a nominal value of 1.875 volts with respect to the voltage applied to the −V terminal 396. In the embodiments of FIGS. 4 and 5, the −V terminal 396 is connected to the common line 351. The regulator 500 also develops an analog common phi at the terminal 362. This output can both source and sink current. The purpose of the analog common is to provide a artificial ground within the exposure meter so as to allow bypolar operation of various circuit elements.

The linear-to-logarithmic conversion circuitry includes two transistors 502 and 504, two amplifiers 506 and 508, and thus instrumentation amplifiers 510 and 512. The collector of the transistor 502 is connected to the Iin terminal 366 and is also connected to the inverting input of the amplifier 506. The base of the transistor 502 is internally connected to the analog ground phi terminal 362. The analog common phi is also connected to the non-inverting input of the amplifier 508 and through a resistor 514 to the non-inverting input of the amplifier 506. The transistor 502 emitter is connected to a first input 516a of the instrumentation amplifier 510 and is also connected through a resistor 517 to the output of the amplifier 506 and the compensation (COMP) terminal 364. The non-inverting input of the amplifier 506 is also connected through a resistor 518 to the offset-null (O/N) terminal 368.

The base and collector terminals of the transistor 504 are connected together and to the Iref terminal 370 and also the the non-inverting terminal of the amplifier 508. The output of the amplifier 508 is connected to the emitter of transistor 504, to a second input 516b of the instrumentation amplifier 510, and to a first input 520A of an instrumentation amplifier 522. A compensation capacitor 524 is connected from the COMP terminal 364 to the Iin terminal 366 to compensate for the gain of the transistor 502 in the feedback loop of the amplifier 506. A potentiometer 526 provides an offset-null signal through the O/N terminal 368 and the resistor 518 to the amplifier 506 to set the diode 10 bias to zero to reduce dark current affects. Additionally, a resistor 528 connected to Vref provides a reference current through the Iref terminal 370 to the amplifier 508 and the transistor 504.

The operation of the conversion circuitry is based on the relationship between the collector current and the emitter-base voltage of two identical transistors 502 and 504. A first reference current is applied to the transistor 504 through the Iref terminal 370 and produces a voltage at the input 516b of the instrumentation amplifier 510. A second current from the diode 10 or from the resistor 241 as selected by the switch 226 (FIG. 3) is applied through the Iin terminal 366 to the collector of transistor 502 and, in turn, produces a second voltage that is applied to the terminal 516a of the amplifier 510. The ratio of these two voltages provides an output from the amplifier 510 through the B terminal 388 that is logarithmically proportional to the current flowing through the transistor 502. The signal from the terminal B is then applied through the potentiometer 304 and the remaining circuitry as was described with reference to FIGS. 4 and 5. The resistors 530 and 532 establish the gain developed by the instrumentation amplifier 510.

An instrumentation amplifier 522, an instrumentation amplifier 534, and a transistor 536 form an anti-logarithmic circuit, the output of which at the collector of the transistor 536 is not used in the embodiments of the present invention. The input of the anti-logarithmic circuit at the Ts terminal 394 is connected to the analog common phi to prevent the anti-logarithmic circuitry from affecting the remaining circuitry of the calculator chip 300.

A summing amplifier and a sample and hold function are implemented by means of an amplifier 538, a switch 540, an amplifier 542, and two inverting buffers 544 and 546. The amplifier 538 is a non-inverting amplifier with the inverting input internally connected to the analog common phi. The output of the amplifier 538 is applied through the switch 540 to the amplifier 542 which is a inverting buffer. When a high-level signal is applied to the B/T terminal 382, the inverters 544 and 546 control the switch 540 so as to apply the output of the amplifier 538 to the amplifier 542, thus charging a hold capacitor 548 through a resistor 549. Conversely, when a low-level signal is applied to the B/T terminal 382, the switch 540 removes the output of the amplifier 538 from the input of the amplifier 542, thus maintaining the charge on the capacitor 548. In this manner, a sample and hold circuit is formed. In the embodiment of FIG. 4, the B/T terminal 382 is connected to +V power and thus the output terminal −EV 384 follows the inputs applied to the ADD termimal 378 as summed by the amplifier 538 (FIGS. 4 and 6). However, in the embodiment of FIG. 5, the output −EV 384 is controlled by the sample and hold control line 173 from the servo driver 172 (FIGS. 5 and 6), and thus the signal at the output terminal −EV 384 tracks the summed signals applied to the ADD terminal 378 when a high-level signal is applied by the line 173 to the B/T terminal 382. The output value at the terminal −EV 384 is then held when a low-level signal is applied by the line 173 to the B/T terminal 382.

The calculator chip 300 (FIG. 6) further includes two inverting amplifiers 550 and 552. The non-inverting inputs of each amplifier 550 and 552 are internally applied to the analog common phi. In the embodiment of the exposure meter illustrated with reference to FIG. 4, three resistors 353, 355, and 357 provide a voltage dividing network from +V power to the common line 351. As the battery voltage applied to the +V power line through the power on timer 120 gradually decreases, the amplifier 550 will generate a first signal at the OUT 2 terminal 390. That indicates that the battery has been drained to approximately 10% of its capacity. As the battery voltage further declines, the amplifier 552 will produce a second output at the OUT 1 terminal 392 indicating that the battery has drained to a point where the exposure meter will no longer provide accurate readings. The signals are applied to the display driver as was described with reference to FIG. 2A.

In the embodiment of the exposure of FIG. 5, the amplifier 552 is used to sum the signals that are applied to the summing node 170 and to provide this summed signal from the OUT 1 terminal 392 to servo driver 172. The amplifier 550 provides a low battery signal at the OUT 2 terminal 390 through the inverter 342d to illuminate the BATT LED 434d to indicate that the battery has drained to approximately 10% of its capacity. A second amplifier 426 in combination with a diode 428 and a resistor 430 provide a high-level signal to the servo driver 172 which allows the servo driver 172 to operte. However, when the voltage drop developed between the resistors 353 and 355 (FIG. 5) drops so as to indicate that the battery no longer has sufficient power for the exposure meter to provide reliable readings, the amplifier 426 will generate a low-level signal that disables the servo driver 172 and extinguishes the ON LED 434c through the inverting buffer 432c.

Turning now to a description of the optical accessory interface means according to the present invention, an exposure meter 600 includes a case 602 at which is disposed at one end 604 a portion of the interface means of the present invention as will be described more fully with reference to FIGS. 8 and 9. The exposure meter 600 further includes a thumb-operated lever 606 that positions the function switch 148 (FIG. 2A). The case 602 includes a window 608 through which the index number is displayed. The index number previously described is then used to operate a hand-operated calculator dial 610 in a manner that is well known in the art. The exposure meter 600 additionally includes a thumb wheel 611 of the continuous/flash shutter speed control 112 (FIG. 2A). A letter C and a plurality of numerals are formed into the wheel 611 and are displayed through a window 612. A flash PC terminal 150 may be included for connecting the exposure meter 600 to a flashed light source.

The end 604 of the exposure meter 600 includes a lip member 700 which defines a generally rectangular opening 702. The outer surface 800 (FIG. 9) is inclined toward the opening 702. An inside surface 802 of the lip member 700 is parallel to a support member 804 that has a generally rectangular cross-section. The support member 804 defines a second rectangular opening 806 that is within the opening 702 and is slightly smaller than the rectangular opening 702. The support member 804 and the lip member 700 may be formed into the case 602; the case 602 may also include a wall member 808 that is parallel to the support member 804 and which extends from a wall of the case 602 beyond the openings 806 and 702. The wall member 808 terminates in a generally cylindrical screw support 810 which is adapted to receive a screw 812. The screw 812 may be used, for example, to secure the upper portion 704 to the lower portion 706 of the case 602 (FIG. 8).

Disposed between the support member 804 and the wall member 808 (FIG. 9) is an exposure meter end assembly 814. The end assembly 814 has an outer surface 816 that is generally parallel with the support member 804 and that is recessed within the openings 702 and 806. The end assembly 814 is secured to the case 602 by means of two rectangular mounting tabs 818a and 818b (FIGS. 8 and 9). Each mounting tab 818a and 818b is disposed between the support member 804 and the wall member 808. A beveled surface 820 is formed into each mounting tab 818a and 818b and is inclined toward the end assembly outside surface 816.

Formed into the end assembly 814 is a receiving member designated generally 822 (FIGS. 8 and 9). The receiving member 822 has a first cylindrical side wall portion 824 that extends from the outside surface 816 of the end assembly 824 toward the first and second openings 702 and 806. The side wall portion 824 terminates slightly before reaching a plane defined by an outside surface 826 of the support member 804. The receiving member 822 further includes a second cylindrical side wall portion 827. The first and second portions 824 and 827 are formed to include a first inside cylindrical surface 828 which defines at its outer end a circular opening 830. The axis of the surface 828 is generally perpendicular to the surface 816. The second cylindrical side wall portion 827 is further formed to include a second inside cylindrical surface 832 that is coaxial with the surface 828. Bridging the first surface 828 and the second surface 832 is an anular bridging portion 834. At an end of the receiving member 822 opposite from the circular opening 832 is formed an end disc 836 into which is formed an opening 838 for receiving a blue filter 840 and the sensor 10. The blue filter 840 corrects the response of the sensor 10 to more closely match the response of photographic film emulsions. Also formed to the end assembly 814 is a cavity 842 in which is disposed two metallic elongated contacts 844 and 846. The cavity 842 and the contacts 844 and 846 generally comprise an electrical contact means that may be included in the accessory program input 40 previously described.

With reference now to FIG. 10, an optical accessory 900 employing the interface means of the present invention is shown. The optical accessory 900 is intended to adapt the exposure meter 600 (FIG. 7) so as to be more useful in a photographic studio. It is to be understood that the interface means of the present invention is not limited to a particular type of optical accessory such as the studio optical accessory 900 but may be used in conjunction with optical accessories that serve other purposes as, for example, a spot meter accessory or a microscope accessory.

The optical accessory 900 (FIG. 10) includes a rotatable head 902 and a base assembly 904. The rotatable head 902 includes a diffuser 906 that is shown in FIG. 10 removed from the rotatable head 902. The diffuser 906 comprises a hemispherical translucent dome 908 (FIGS. 10 and 11) and a plurality of segmented fingers 910 that are adapted to engage a corresponding set of segmented fingers 912 on the head 902 so that the diffuser 906 may be mounted to the head 902. The head 902 additionally includes an opaque disk 914 into which is formed a concentric circular opening 916. In a preferred embodiment, the disk 914 is formed from an opaque white material and provides a reflective surface when the diffuser 906 is in place on the head 902.

The base assembly 904 includes an upper housing 918 and a lower housing 920. The lower housing 920 is formed so as to include an angled surface 922 that joins the upper housing 918 to a rectangular base 924 which extends slightly downward from the surface 922. Extending from a lower surface 926 from a first end of the rectangular base 924 are two pads 928a and 928b (FIGS. 10 and 11). Extending from a second end of the base 924 is a third pad 930. The lower surfaces of the pads 928a, 928b and 930 define a plane that is slightly below the surface 926.

Figure 13:
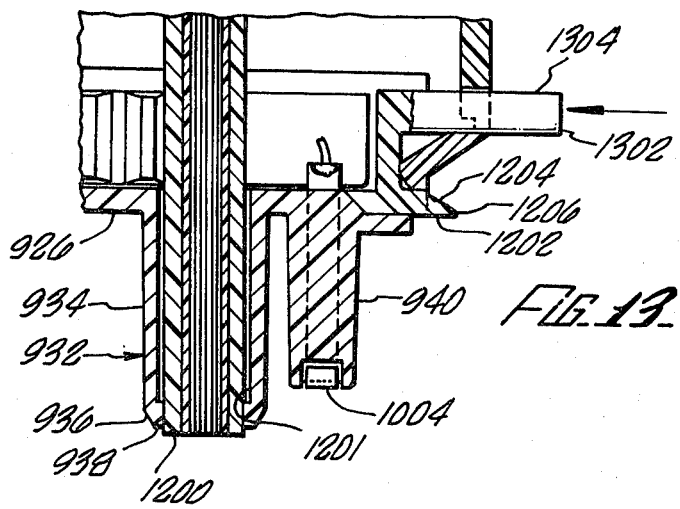
FIG. 13 is a sectional view of a portion of the optical interface of the present invention.

Also extending from the surface 926 is an extending member 932. The outer surface of the extending member 932 is formed to include a slightly tapered surface 934 that extends from the surface 926 to a beveled ring 936 which is, in turn, joined to an anular ring 938. The annular ring 938 defines an orifice 1200 (FIG. 13). The surface 934 is generally cylindrical and slightly tapered. The extending member 932 includes an interior surface 1201.

Extending from the pad 930 (FIG. 10) is a contact support member 940 which has two opposite and slightly converging elongated surfaces 1000 and 1002 upon which are mounted two elongated metallic contacts 1004 and 1006.

Figure 14:
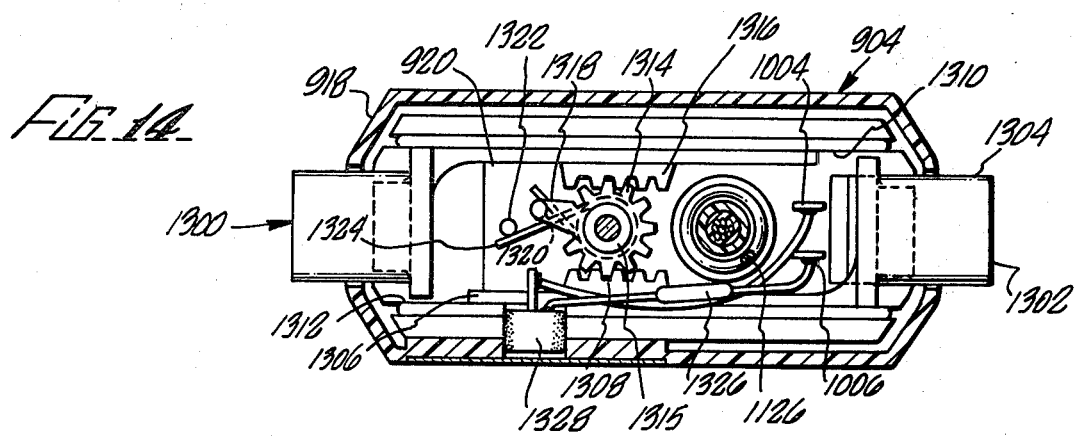
FIG. 14 is a sectional view of the accessory of FIG 10 taken substantially along the lines 14—14.
Figure 15:
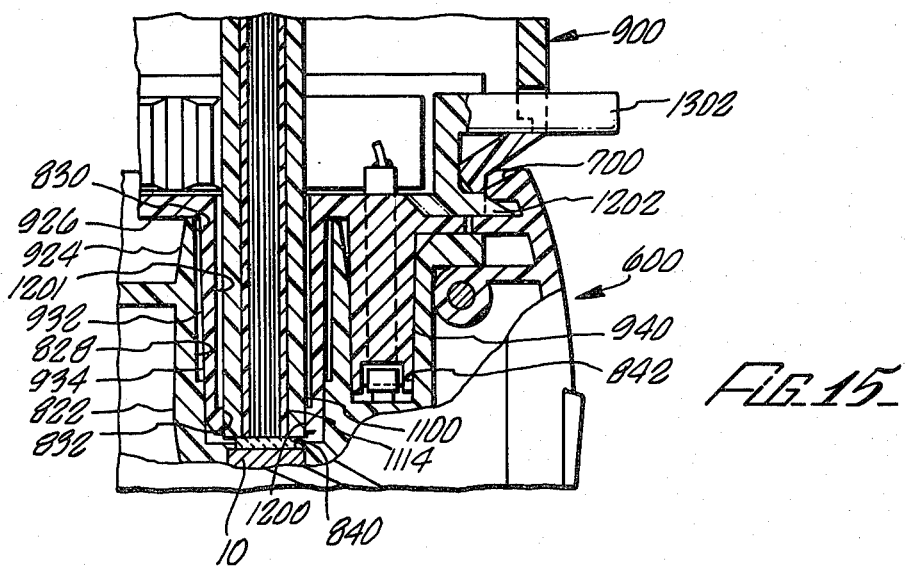
FIG. 15 is a sectional view of an exemplary embodiment of an interface means according to the present invention.

With reference to FIG. 14, the base assembly 904 includes a first and second catch actuator 1300 and 1302. The actuator 1302 includes a button member 1304, a rack 1306 including a plurality of teeth 1308, and a claw member 1202 (FIG. 13) that is disposed generally parallel to the button member 1304. The claw member 1202 includes an upper surface 1204 that narrows the claw member 1202 toward an outer edge 1206. The actuator 1300 (FIG. 14) is formed to include similar members. The actuators 1300 and 1302 are oppositely disposed in the base assembly 904 and are guided by means of opposite and parallel guiding surfaces 1310 and 1312. Disposed upon a hollow shaft 1315 that extends from the lower housing 920 and that is intermediate the actuators 1300 and 1302 is a gear 1314. The gear 1314 includes a plurality of teeth that engage the teeth 1308 and a set of teeth 1316 that are similarly disposed on the actuator 1300. An arm 1318 extends radially from the gear 1314 and at its outer end is disposed a pin 1320. A similar pin 1322 extends from the lower housing 920. A loop spring 1324 is disposed around the shaft 1315 and engages the pins 1320 and 1322 such that the gear 1314 tends to rotate counterclockwise as viewed in FIG. 14. The actuators 1300 and 1302 (FIG. 10) may be urged toward the center of the base assembly 904, thus retracting the claw members 1202 and 942 and rotating the gear 1314 in a clockwise direction as seen in FIG. 14. Once the actuators 1300 and 1302 are released, the gear 1314 will be urged in a counter-clockwise direction, thus propelling the actuators 1300 and 1302 outward from the base assembly 904 and thus extending the claw members 1202 and 942 (FIG. 10).

Disposed within the head 902 and the base assembly 904 (FIG. 12) is a light transmission conduit 1100. The conduit 1100 includes a first tubular member 1102 that is connected to a second and perpendicular tubular member 1104 by means of an arcuate tubular portion 1106. Formed near a first end 1108 of the member 1102 is a flange 1110. The second tubular member 1104 has a first and lower end 1107 and the member 1104 is formed to include a flange 1112 located approximately midway between the arcuate portion 1106 and the end 1107. Disposed within the conduit 1100 is a fiber optic bundle 1114 that extends from the first end 1108 of the first tubular member 1102 to the end 1107 of the second tubular member 1104.

With reference now to FIG. 12, formed into the upper housing 918 of the base assembly 904 is an annular shoulder 1116 upon which is formed a first ring 1118 and a second ring 1120. The inside diameter of the ring 120 is slightly smaller than the inside diameter of the ring 1118, thereby creating an annular shoulder 1122.

The conduit 1110 is passed through the first and second ring 1118 and 1120 and is positioned so that an upper surface of the flange 1112 abuts the shoulder 1122. A washer 1123 is placed against a lower surface of the flange 1112 and a coil spring 1126 is then placed over the conduit 1100. The conduit 1100 is then placed within the extending member 932 and the lower housing 920 is joined to the upper housing 918 by means of a screw 1008 (FIG. 11).

The rotatable head 902 maybe formed from a front housing 1124 and a rear housing 1126 (FIG. 12). The front housing 1124 includes a front member 1128 that has an inside surface 1130. An opening 1132 is formed into the front member 1128. The disk 914 is affixed to an outside surface of the front member 1128 such that the openings 916 and 1132 are concentric. The end 1108 of the first tubular member 1102 is placed within the opening 1132 such that the inside surface 1130 of the front member 1128 abuts the flange 1110. The rear housing 1126 includes a cylindrical post projection which in turn supports a cylindrical peg 1136. The outside diameter of the peg 1136 is such that it will fit within the first tubular member 1102. The rear housing 1126 is assembled to the front housing 1124 by means of, for example, screws (not shown) such that the post 1134 urges the conduit 1100 toward the inside surface 1130. Thus the conduit 1100 provides a path for the fiber optic bundle 1114 and also provides a means for joining the rotatable head 902 to the base assembly 904. The spring 1126 and the washer 1123 urge the flange 1112 of the conduit 1100 toward the shoulder 1122 thereby providing a slight resistance to the rotation of the rotatable head 902.

The optical accessory 900 includes circuit elements required to provide a compensation signal to the exposure meter 600 that is logarithmically proportional to the transmission loss or gain associated with the optical accessory. Each of the contacts 1004 and 1006 passes through the lower housing 920 as shown in FIGS. 13 and 14. The contact 1006 is connected to a resistor 1326 which is in turn connected to a potentiometer 1328. The potentiometer is then connected to the terminal 1004. The resistor 1326 and the potentiometer 1328 comprise the resistance of the resistor 334 of FIGS. 4 and 5. When the optical accessory 900 is mated to the exposure meter 600 as will be described with reference to 15, a reference voltage is applied from the contact 844 (FIG. 8) of the exposure meter 600 to the contact 1006. This voltage applied through the resistor 1326 and the potentiometer 1328 provides a reference current through the contact 1004 to the terminal 846 of the exposure meter 600, thereby applying a compensation signal to the circuitry of the exposure meter 600.

When the optical accessory 900 is to be mated to the exposure meter 600 (FIG. 15), the actuators 1300 and 1302 (FIG. 10) are operated, retracting the claw members 942 and 1202. The optical accessory 900 is then fitted to the exposure meter 600 such that the extending member 932 is disposed within the receiving member 822 and the contact support member 940 is similarly disposed within the cavity 842. The actuators 1300 and 1302 are then released and the claw members 942 and 1202 engage the lip member 700, thereby securing the optical accessory 900 to the exposure meter 600. When thus secured, the second inside cylindrical surface 832 of the receiving member 822 guides the tapered surface 934 of the extending member 932 so as to position the fiber optic bundle 1114 accurately with respect to the blue filter 840 and the diode 10. In this way the light received by the fiber optic bundle 1114 through the opening 916 from the dome 908 is transmitted through the bundle 1114 and is applied through the blue filter 840 to the diode 10. Once the optical accessory 900 is mated to the exposure meter 600, a light trap is formed that prevents stray light from reaching the diode 10.

It will be appreciated that the light transmission means of the present invention is not limited to the conduit 1100 and the fiber optic bundle 1114. For example, the light from the light receiving portion of an optical accessory may be provided directly into a region defined by the surface 1201 of the extending member 932 and thus the orifice 1200 would define the aperture through which the transmitted light would pass. This configuration may be useful, for example, in a spot reading accessory wherein the orifice 1200 defines the field stop for the spot reading and thus substantially determines the transmission characteristics of the optical accessory. Since the field stop formed by the orifice 1200 is adjacent to the blue filter 840 and the diode 10, it will be seen that the diameter of the orifice 1200 may be adjusted so that all of the light passing through the orifice 1200 falls upon the diode 10, thus maximizing the overall sensitivity of the combination formed by the optical accessory 900 and the exposure meter 600.

The opening 830 defines the angle of light that will fall upon the sensor 10, and thus defines the reflected light measuring angle of the exposure meter 600 when the optical accessory 900 is removed and the exposure meter 600 is positioned so as to read reflected light.

Having thus described my invention in detail, it is to be understood that numerous equivalents and alternatives that do not depart from the invention will be apparent to those skilled in the art, given the teachings herein. Thus, my invention is not to be limited to the above-description but is to be of the full scope of the appended claims.

What is claimed is:

1. An exposure meter for measuring light from continuous or flashed light sources or both, comprising
   sensor means for generating a signal proportional to the intensity of the light,
   timing means for generating a predetermined time period signal corresponding to a predetermined time period,
   integrator means responsive to the predetermined time period signal and to the sensor means signal for summing the signal from the sensor means for at least one predetermined time period and for providing a signal proportional to the sum,
   logarithmic amplifier means responsive either to the integrator means signal or to the sensor means signal for producing a logarithmic signal that is logarithmically proportional to the signal applied thereto, and
   display means responsive to the logarithmic signal for displaying exposure data related to light continuously falling upon the sensor means during exposure meter operation or light falling upon the sensor means during the at least one predetermined time period respectively.

2. The exposure meter of claim 1 wherein the timing means includes a timer for generating the predetermined time period signal and differentiator means operably connected to the timer and responsive to rapidly changing sensor means signals for initiating at least one predetermined time period signal.

3. The exposure meter of claim 2 wherein the timing means is responsive to successive rapidly changing sensor means signals thereby operating the integrator means for successive predetermined time periods.

4. The exposure meter of claim 1 wherein the integrator means comprises,
   integrating amplifier means responsive to the sensor means signal for summing the signal over the at least one predetermined time period and for providing an output thereof, and
   sample and hold means responsive to the integrating amplifier means output for sampling said output during each predetermined time period and holding the integrating amplifier means output at the end of each predetermined time period.

5. The exposure meter of claim 4 wherein
   the integrating amplifier means includes an amplfier with an input responsive to the sensor means signal and an output and an integrating capacitor connected from the amplifier output to one amplifier input, and
   the sample and hold means includes a hold capacitor and switching means responsive to the predetermined time period signal for connecting the hold capacitor to the amplifier output during the predetermined time period and for then connecting the hold capacitor in parallel with the integrating capacitor to reduce the integrator means drift after the predetermined time period.

6. The exposure meter of claim 5 wherein the hold capacitor has substantially greater capacity than the integrating capacitor.

7. The exposure meter of claim 1 wherein the timing means includes adjustment means for adjusting the length of the predetermined time period signal.

8. The exposure meter of claim 1 wherein the exposure meter is adapted to receive optical accessories and the optical accessories generate correction signals, the exposure meter further including
means for receiving the correction signal, and
summing means intermediate the logarithmic amplifier means and the display means for summing the logarithmic signal and the correction signal and for providing the resulting signal to the display means.

9. The exposure meter of claim 8 wherein the exposure meter further includes generating means for generating a reference signal and the means for receiving the correction signal further includes means for applying the reference signal to the accessory.

10. The exposure meter of claim 9 further including means responsive to an optical accessory to alter over-under range indications.

11. The exposure meter of claim 1 further including indicator means for providing a signal when said display means has responded to the logarithmic signal.

12. An exposure meter as in claim 1 further including
film speed means for generating a signal logarithmically related to film speed, and
summing means for summing the film speed means signal with the logarithmic signal to provide a summed signal and for applying the summed signal to the display means when the logarithmic amplifier means is responsive to the integrator means signal.

13. An exposure meter as in claim 1 wherein the exposure meter includes actuation means for causing the exposure meter to generate the logarithmic signal from the logarithmic amplifier means when the actuation means is actuated, and said display means further includes
servo-operated drive means for adjusting a display of exposure data,
storage means for storing said logarithmic signal when said actuation means is released,
delay means responsive to the release of said actuation means for generating a delay signal, and
said servo-operated drive means is responsive to said stored logarithmic signal and said delay signal such that said delay signal maintains said servo-operated drive means energized until said servo-operated drive means has fully responded to said logarithmic signal.

14. A photographic exposure metering system comprising
optical sensor means for generating a signal responsive to the light incident thereon,
differentiator means responsive to said optical sensor means signal for detecting a rapid change in the optical sensor means signal,
timing means responsive to said differentiator means for generating a timing signal for a predetermined period of time,
integrator means response to said optical sensor means signal and said timing for summing the signal from said optical sensor means for the period of time determined by said timing means,
sample and hold means for storing a signal proportional to the sum from said integrator means,
logarithmic amplifier means responsive to either said optical sensor means signal or the sample and hold means signal for generating a signal logarithmically proportional to either said optical sensor means signal or said sample and hold means signal, and
output means responsive to said logarithmic amplifier means for providing signals indicative of an exposure setting.

15. A photographic exposure meter suitable for use with continuous or flashed light sources comprising
an optical sensor for generating a signal proportional to the intensity of light incident thereon,
switch means having first and second positions for receiving the signal from said optical sensor,
timing means responsive to said optical sensor signal when said switch means is in the first position, said timing means detecting a rapid change in the optical sensor signal indicative of the start of a light flash from a flashed light source and generating a timing signal for a predetermined period in response thereto,
integrator means responsive to said timing signal and said optical sensor signal when said switch means is in said first position for integrating the optical sensor signal and for providing an output proportional thereto,
logarithmic amplifier means, responsive either to the optical sensor when said switch means is in the said second position or said integrator means when said switch means is in said first position, for generating a signal which is logarithmically proportional to either said optical sensor signal or said integrator means output, and
output means responsive to said logarithmic amplifier means for providing signals representative of an exposure setting corresponding to the light detected by said optical sensor.

16. A method for measuring light from continuous or flashed light sources, or both, comprising,
generating a first signal proportional to the intensity of the light,
either applying the first signal to logarithmic amplifier means or applying the first signal to integrator means and the output of the integrator means to the logarithmic amplifier means,
generating a predetermined time period signal corresponding to a predetermined time period,
integrating the first signal by the integrator means for at least one predetermined time period when the first signal is applied to the integrator means,
producing a logarithmic signal by the logarithmic amplifier means that is logarithmically proportional to the signal applied thereto, and
displaying the logarithmic signal as exposure data.

17. A photographic exposure metering method comprising
generating a signal responsive to the light incident upon optical sensor means,
detecting a rapid change in the optical sensor means signal,
generating a timing signal in response to the detecting step for a predetermined a period of time,
summing the signal from said optical sensor means for the period of time determined by the timing signal, storing a signal proportional to the sum produced by the summing step, generating a signal logarithmically proportionally to either said optical sensor means signal or said signal produced by the storing step, and providing signals responsive to the logarithmically proportional signal indicative of an exposure setting.

18. A photographic exposure metering method suitable for use for continuous or flashed light sources comprising generating a first signal proportional to the intensity of light incident upon an optical sensor, receiving the first signal by switch means having first and second positions providing respective selectable first and second outputs of said first signal, detecting a rapid change in said first output indicative of the start of a light flash from a flashed light source and generating a timing signal for a predetermined time period in response thereto, integrating the first output and providing an integrated output proportional thereto in response to said timing signal, generating a logarithmic signal which is logarithmically proportional to either said second output or to said integrated output and providing signals representative of an exposure setting corresponding to said logarithmic signal.

* * * * *